United States Patent
Sarashina

(10) Patent No.: US 8,260,134 B2
(45) Date of Patent: Sep. 4, 2012

(54) SYNCHRONIZED CODE DIVISION MULTIPLEXING COMMUNICATION METHOD AND SYNCHRONIZED CODE DIVISION MULTIPLEXING COMMUNICATION SYSTEM

(75) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 564 days.

(21) Appl. No.: 12/458,561

(22) Filed: Jul. 16, 2009

(65) Prior Publication Data

US 2010/0080559 A1    Apr. 1, 2010

(30) Foreign Application Priority Data

Sep. 29, 2008  (JP) ................. 2008-250107

(51) Int. Cl.
*H04J 14/00* (2006.01)
*H04J 4/00* (2006.01)

(52) U.S. Cl. ........................................ 398/67; 398/77
(58) Field of Classification Search ............. 398/77
See application file for complete search history.

(56) References Cited

U.S. PATENT DOCUMENTS

| | | | | |
|---|---|---|---|---|
| 6,704,932 | B1 * | 3/2004 | Matsunaga et al. | 725/126 |
| 7,630,642 | B2 * | 12/2009 | Tamai et al. | 398/77 |
| 7,873,277 | B2 * | 1/2011 | Kazawa et al. | 398/68 |
| 2007/0177874 | A1 * | 8/2007 | Kashima et al. | 398/77 |
| 2008/0166127 | A1 * | 7/2008 | Kazawa et al. | 398/79 |
| 2009/0080891 | A1 * | 3/2009 | Kazawa et al. | 398/79 |
| 2010/0086304 | A1 * | 4/2010 | Mizutani et al. | 398/71 |

FOREIGN PATENT DOCUMENTS

| | | |
|---|---|---|
| JP | 2005-033544 A | 2/2005 |
| JP | 2007-228134 A | 9/2007 |

OTHER PUBLICATIONS

H. Onishi et al., "Ethernet PON System," Fujikura Technical Review, No. 102 (Apr. 2002), pp. 18-21.
Yoshio Miyamori et al., "PON Based All Fiber-Optic Access System," Hitachi Review, vol. 47 (1998), No. 2, pp. 63-66.

* cited by examiner

*Primary Examiner* — Kenneth N Vanderpuye
*Assistant Examiner* — Abbas H Alagheband
(74) *Attorney, Agent, or Firm* — Rabin & Berdo, P.C.

(57) ABSTRACT

A synchronized CDM communication system performs 1-to-N communication by CDM between a central office and first to N-th optical network units (ONU). The synchronized CDM communication system adds structural elements for realizing a connection state acquisition section to a conventional synchronized CDM communication system. A central office includes a presence check section, a ranging processing section and the connection state acquisition section. The presence check section checks the ONUs that are connected with the central office and the ONUs that are not connected. The ranging processing section performs transmission timing adjustments for the ONUs that are connected. The connection state acquisition section verifies whether all of ONUs are connected with the central office, and performs a discovery of a ONU, among the ONUs that were not connected at the time of the check, that has resumed participation in communication since the check ended.

6 Claims, 15 Drawing Sheets

SYNCHRONIZED CODE DIVISION MULTIPLEXING COMMUNICATION METHOD AND SYNCHRONIZED CODE DIVISION MULTIPLEXING COMMUNICATION SYSTEM

CROSS-REFERENCE TO RELATED APPLICATION

This application claims priority under 35 USC 119 from Japanese Patent Application No. 2008-250107 filed on Sep. 29, 2008, the disclosure of which is incorporated by reference herein.

BACKGROUND OF THE INVENTION

1. Field of the Invention

The present invention relates to a synchronized code division multiplexing (CDM) communication method and a synchronized CDM communication system that implement communication between a central office (an optical line terminal (OLT)) and plural optical network units (ONU) using synchronized code division multiplexing.

2. Description of the Related Art

An optical access network system which is configured by connecting a central office and plural ONUs together with a PON (a passive optical network) is a representative example of a communication system between a central office and plural ONUs. The central office is equipment installed at a business (referred to as a center node, a service node or the like). The ONUs are equipment (referred to as edge nodes or the like) installed at subscribers (also referred to as users).

A PON is a network in which a optical splitter (also referred to as a star coupler) is connected partway along an optical fiber transmission line to split a single optical fiber transmission line into plural optical fiber transmission lines, and in which plural ONUs are connected in a star configuration around the optical splitter (see, for example, H. Onishi et al., "Ethernet PON Systems", Fujikura Technical Review, No. 102 (April 2002), pp. 18-21 [Document 1], and Y Miyamori et al., "PON Based All Fiber-Optical Access System", Hitachi Review, Vol. 47, No. 2 (1998), pp. 63-66). A PON is deployed in a network connecting between a central office and ONUs. Due thereto, the optical fiber transmission line between the central office and the optical splitter may be shared by plural ONUs. Therefore, equipment costs can be kept down.

Hereinafter, communication between a central office and N ONUs will be referred to as "1-to-N communication" (herein, N is an integer of at least two). In communication from the ONUs to the central office (hereinafter referred to as upstream communication), a synchronized CDM communication system that is configured using a PON has to multiplex encoded signals from plural ONUs at the same time. Therefore, communication timings of the plural ONUs must be synchronized. In general, the distance from the central office to the ONU is different for each ONU. Therefore, it is necessary to carry out ranging, which adjusts the communication timings, in accordance with the respective distances from the ONUs to the central office.

A related art ranging method is implemented as follows. First, the central office sends an echo transmission instruction to the plural ONUs. The ONUs receiving the instruction respectively return echoes to the central office. Then, from the echoes, the central office measures the respective distances to the ONUs that returned the echoes. Hence, the central office determines transmission timings in accordance with the respective distances to the ONUs, and synchronizes transmission timings of the plural ONUs (see, for example, Japanese Patent Application Laid-Open (JP-A) Nos. 2005-33544 and 2007-228134).

In synchronized CDM communication based on the above-described ranging method, when a new ONU, for which ranging has not been completed, is added to upstream communication, ranging must be performed for the newly added ONU too. Therefore, the central office must continuously carry on operations for discovering newly added ONUs. Accordingly, in addition to transmission data, it is necessary to reserve a time interval in transmission frames for discovering newly added ONUs (a discovery time interval).

Here, the meaning of the term "newly added ONU" includes a ONU that is added to a communication system when a user requests commencement of communication services. That is, an added ONU is a ONU that was not connected to the communication system at the start of operation of the communication system. The ONU is first connected to the communication system only after the user requests the commencement of communication services. For the discovery time interval, it is necessary to reserve a duration for an echo signal to travel both ways between the central office and a newly added ONU. Therefore, if such a time interval is provided in the transmission frame, a non-data transmission time interval in the transmission frame is extended, leading to a fall in transfer efficiency.

SUMMARY OF THE INVENTION

The present invention is to provide a synchronized CDM communication method and synchronized CDM communication system that prevent a fall in transfer efficiency caused by the provision of a discovery time interval in transmission frames.

An aspect of the present invention is a synchronized code division multiplexing communication method that utilizes an access network system including, a common transmission line provided with a optical splitter that branches one input signal to N outputs, N being an integer of at least two, and combines N input signals and outputs one signal, a central office coupled to an other end of the common transmission line, N branch transmission lines which are formed by branching by the optical splitter, and first to N-th ONUs that are coupled to the respective branch transmission lines, the access network system performing 1-to-N communication by code division multiplexing between the central office and the first to N-th ONUs, the synchronized code division multiplexing communication method including, at the central office: a presence check step of performing a check of device terminals that are connected to the central office and device terminals that are not connected, on the basis of whether or not the central office receives response signals returned from the first to N-th ONUs; a ranging processing step of performing a transmission timing adjustment for the ONUs that are connected, on the basis of response times determined by the times at which the response signals are received by the central office; a connection state acquisition step of performing a verification of whether or not all of the first to N-th ONUs are in the state of being connected with the central office and a verification of whether or not a ONU that was not connected at the presence check step has come into the state of being connected since completion of the presence check step; and a transmission frame switching step of, if all of the first to N-th ONUs are in the state of being connected with the central office, switching the network system to communicate with transmission frames that do not include a discovery time interval, if a ONU that has been not connected has come into the state of being connected since completion of the presence check step, performing communication with transmission frames that include the discovery time interval, and if no ONU that has been not connected has come into the state of being connected, performing communication with transmission frames that do not include the discovery time interval.

Another aspect of the present invention is a synchronized code division multiplexing communication system that utilizes an access network system including, a common transmission line provided with a optical splitter that branches one input signal to N outputs, N being an integer of at least two, and combines N input signals and outputs one signal, a central office coupled to an other end of the common transmission line, N branch transmission lines which are formed by branching by the optical splitter, and first to N-th ONUs that are coupled to the respective branch transmission lines, the access network system performing 1-to-N communication by code division multiplexing between the central office and the first to N-th ONUs, the synchronized code division multiplexing communication system including, at the central office: a presence check section that performs a check of device terminals that are connected to the central office and device terminals that are not connected, on the basis of whether or not the central office receives response signals returned from the first to N-th ONUs; a ranging processing section that performs a transmission timing adjustment for the ONUs that are connected, on the basis of response times determined by the times at which the response signals are received by the central office; a connection state acquisition section that performs a verification of whether or not all of the first to N-th ONUs are in the state of being connected with the central office and discovery of a ONU, among the ONUs that are not connected, that has come into the state of being connected during communication operations since completion of the check and is newly participating in communication; and a transmission frame switching switch that switches between transmission frames that include a discovery time interval and transmission frames that do not include the discovery time interval.

Yet another aspect of the present invention is a synchronized code division multiplexing communication system that utilizes an access network system including, a common transmission line provided with a optical splitter that branches one input signal to N outputs, N being an integer of at least two, and combines N input signals and outputs one signal, a central office coupled to an other end of the common transmission line, N branch transmission lines which are formed by branching by the optical splitter, and first to N-th ONUs that are coupled to the respective branch transmission lines, the access network system performing 1-to-N communication by code division multiplexing between the central office and the first to N-th ONUs, the synchronized code division multiplexing communication system including, at the central office: a presence check section that performs a check of device terminals that are connected to the central office and device terminals that are not connected, on the basis of whether or not the central office receives response signals returned from the first to N-th ONUs; a ranging processing section that performs a transmission timing adjustment for the ONUs that are connected, on the basis of response times determined by the times at which the response signals are received by the central office; a connection state acquisition section that performs a verification of whether or not all of the first to N-th ONUs are in the state of being connected with the central office and discovery of a ONU, among the ONUs that are not connected, that has come into the state of being connected during communication operations since completion of the check and is newly participating in communication; and a transmission frame switching switch that switches between transmission frames that include a discovery time interval and transmission frames that do not include the discovery time interval, wherein each of the first to N-th ONUs is provided with a transmission frame switching switch that switches between the transmission frames that include the discovery time interval and the transmission frames that do not include the discovery time interval.

BRIEF DESCRIPTION OF THE DRAWINGS

Exemplary embodiments of the present invention will be described in detail based on the following figures, wherein.

DETAILED DESCRIPTION OF THE INVENTION

Figure 1:
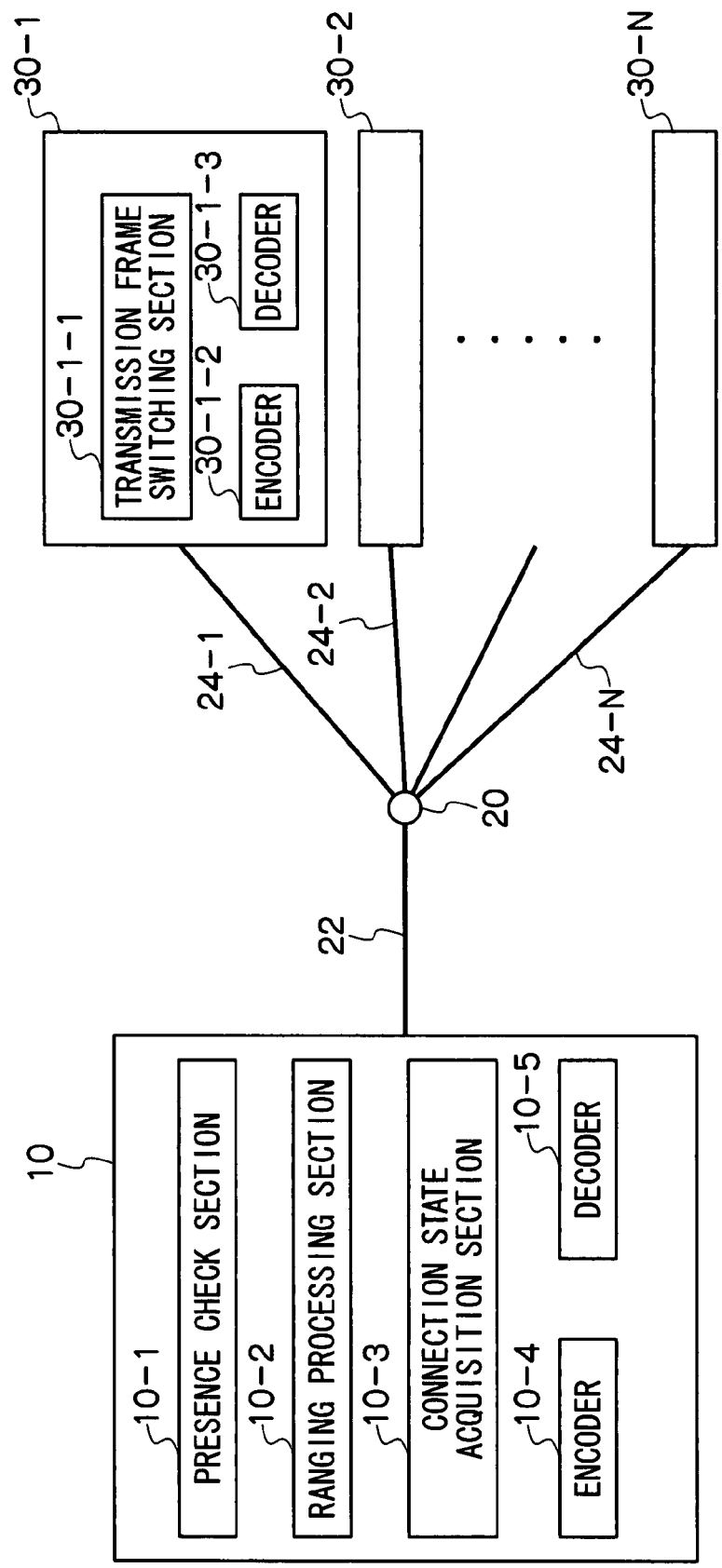
FIG. 1 is a structural block diagram schematically illustrating overall structure of a synchronized CDM communication system, according to an exemplary embodiment of the present invention.

The inventors of the present invention have discovered a solution can be achieved if the configuration described below is concretely assembled. That is: preparing a transmission frame including a discovery time interval and a transmission frame not including a discovery time interval; communicating with the transmission frame not including the discovery time interval when a maximum number of ONUs that are physically connected to a central office are in states capable of communication with the central office; and communicating with the transmission frame including the discovery time interval when fewer than the maximum number of ONUs are in states capable of communication with the central office. According to a synchronized CDM communication method and a synchronized CDM communication system with such configurations, communication is performed with the transmission frame not including the discovery time interval when the maximum number of ONUs are in states capable of communication with the central office. Therefore, according to the above-described configuration, there is no need for communication efficiency to be lowered.

According to the fundamentals of the present invention in accordance with the above concept, a synchronized CDM communication method and synchronized CDM communication system described below are provided.

In the synchronized CDM communication method of the present invention, a optical splitter, that branches one input signal into N outputs (N is an integer of at least two) or couples N input signals and outputs one signal, is provided at one end of a common transmission line. The synchronized CDM communication method of the present invention employs an access network system that carries out 1-to-N communication, by code division multiplexing, between a central office coupled to the other end of the common transmission line and first to N-th ONUs, which are respectively coupled to N branch transmission lines formed by branching by the optical splitter. The synchronized code division multiplexing communication method is configured to include a presence check step, a ranging processing step, a connection state acquisition step and a transmission frame switching step. These steps are steps that are executed at the central office.

Herein, the meaning of the term "coupling" of the central office and a ONU includes a condition in which the central office and the ONU are simply physically linked via a transmission line, and are not in a state in which electronic communication is possible. In contrast, the meaning of a condition in which the central office and a ONU are "connected" is a state in which the central office and the ONU are capable of electronic communications.

The presence check step is a step which carries out a check of ONUs that are connected to the central office and ONUs that are not connected to the central office, on the basis of whether or not the central office receives response signals that are sent from the first to N-th ONUs.

The ranging processing step is a step that carries out adjustment of transmission timings for the ONUs that have been confirmed as being connected, on the basis of response times, which are determined by the times at which the response signals are received by the central office.

The connection state acquisition step is a step that carries out a verification of whether all of the first to N-th ONUs are in the state of being connected with the central office, and a verification of whether or not the ONUs that were confirmed as not being connected in the presence check step have come into the connected state since completion of the presence check step.

The transmission frame switching step is a step that performs communication with the transmission frame that does not include the discovery time interval if, based on the determination of connection states of the first to N-th ONUs, the first to N-th ONUs are all in the connected state with the central office. The terminal frame switching step performs communication with the terminal transmission frame that includes the discovery time interval if it has been verified that a ONU that was confirmed as not being connected in the presence check step has come into the connected state since completion of the presence check step. Furthermore, the transmission frame switching step performs communication with the frame that does not include the discovery time interval if has not been verified that a ONU that was confirmed as not being connected in the presence check step has come into the connected state since completion of the presence check step.

In the synchronized code division multiplexing communication system of the present invention, a optical splitter that splits one input signal into N outputs (N being an integer of at least two) or couples N input signals and outputs one signal is provided at one end of a common transmission line. The synchronized code division multiplexing communication system of the present invention employs an access network system that carries out 1-to-N communication by code division multiplexing between a central office coupled to the other end of the common transmission line and the first to N-th ONUs, which are respectively coupled to the N branch transmission lines formed by splitting by the optical splitter. In the synchronized code division multiplexing communication system, the central office is provided with a presence check section, a ranging processing section, a connection state acquisition section and a transmission frame switching switch, and each of the first to N-th ONUs is provided with a transmission frame switching switch similar to the transmission frame switching switch provided at the central office.

The presence check section carries out a check of ONUs that are connected to the central office and ONUs that are not connected to the central office, on the basis of whether or not the central office receives response signals that are sent from the first to N-th ONUs.

The ranging processing section carries out adjustment of transmission timings for the ONUs that have been confirmed as being connected, on the basis of response times, which are determined by the times at which the response signals are received by the central office.

The connection state acquisition section verifies whether all of the first to N-th ONUs are in the connected state with the central office. The connection state acquisition section also implements discovery of ONUs, among the ONUs that were confirmed as not being connected at the time of the check, that have come into the connected state and are newly participating in communication during communication operations of the synchronized code division multiplexing communication system since the check ended.

The transmission frame switching switch switches between the transmission frame including the discovery time interval and the transmission frame not including the discovery time interval.

The synchronized CDM communication method of the present invention includes the connection state acquisition step and the transmission frame switching step. Due thereto, the synchronized CDM communication method of the present invention properly uses the transmission frame including the discovery time interval and the transmission frame not including the discovery time interval.

Furthermore, the synchronized CDM communication method of the present invention may communicate with the transmission frame not including the discovery time interval, only when all of the first to N-th ONUs are connected with the central office and/or there is no ONU, of ONUs that have been confirmed as not being connected at the time of the check, that has come into the connected state during communication operations of the synchronized CDM communication system since completion of the check.

The connection state acquisition step is a step for ascertaining states in which communication with the transmission frame not including the discovery time interval is possible. The transmission frame switching step implements switching, between communicating with the above-mentioned transmission frame not including the discovery time interval and the transmission frame including the discovery time interval, on the basis of the results when the connection state acquisition step is executed.

In the synchronized CDM communication method of the present invention, time periods in which it is possible to communicate with the transmission frame not including the discovery time interval will be much more common than time periods in which it is necessary to perform communications with the transmission frame including the discovery time interval. Therefore, according to the synchronized CDM communication method of the present invention, communication with the transmission frame including the discovery time interval will be possible in almost all time periods of communication. Thus, compared with a related art synchronized CDM communication method in which communication is carried out with a transmission frame including a discovery time interval, communication with higher communication efficiency is possible.

Herebelow, an exemplary embodiment of the present invention will be described with reference to the drawings. Note that the block structural diagrams illustrate an example of a structure relating to the present invention, and are no more than a schematic illustration of arrangement relationships and the like of structural elements to an extent enabling understanding of the present invention. Accordingly, the present invention is not to be limited to the illustrated example. Moreover, although particular components, conditions and the like are employed in the following descriptions, these components and conditions are no more than one preferable example. Accordingly, the particular components, conditions and the like are to be in no way limiting.

<Synchronized CDM Communication System>

In order to describe a synchronized CDM communication method of an exemplary embodiment of the present invention, structure of an excellent synchronized CDM communication system of the exemplary embodiment of the present invention, in which this method is employed, and general features of operations of the system, will be described with reference to FIG. 1 to FIG. 3.

FIG. 1 is a structural block diagram schematically illustrating overall structure of the synchronized CDM communication system relating to the exemplary embodiment of the present invention.

In the synchronized CDM communication system of the exemplary embodiment of the present invention, a optical splitter 20 that splits one input signal into N outputs (N being an integer of at least two) or couples N input signals and outputs one signal is provided at one end of a common transmission line 22. The synchronized CDM communication system of the exemplary embodiment of the present invention carries out 1-to-N communication by CDM between a central office 10 coupled to the other end of the common transmission line 22 and a first ONU 30-1 to N-th ONU 30-N, which are coupled to each of N branch transmission lines (24-1 to 24-N) formed by branching by the optical splitter 20. That is, in the synchronized CDM communication system of the exemplary embodiment of the present invention, bi-directional communication corresponding to N channels is possible between the central office 10 and the first ONU 30-1 to N-th ONU 30-N.

The synchronized CDM communication system of the exemplary embodiment of the present invention is realized by adding a structural element for realizing the connection state acquisition section to a related art synchronized CDM communication system. If the connection state acquisition section is implemented using a logic integrated circuit which can be designed by a user, such as a PLD (programmable logic device) or the like, no alterations to hardware are necessary.

The central office 10 is provided with a presence check section 10-1, a ranging processing section 10-2 and a connection state acquisition section 10-3. The presence check section 10-1 carries out a check of ONUs that are connected to the central office 10 and ONUs that are not connected, on the basis of whether or not the central office 10 receives response signals sent from the first ONU 30-1 to N-th ONU 30-N. The ranging processing section 10-2 carries out adjustment of transmission timings for the ONUs that have been confirmed as being connected with the central office 10 on the basis of response times, which are determined by the times at which the response signals are received by the central office 10. The connection state acquisition section 10-3 carries out a verification of whether or not all of the first ONU 30-1 to N-th ONU 30-N are in the state of being connected with the central office. The connection state acquisition section 10-3 also implements discovery of ONUs, among ONUs that were confirmed as not being connected at the time of the check, that have come into the connected state and are newly participating in communication during communication operations of the synchronized CDM communication system since the check ended.

The term "N ONUs of first to N-th" indicates the first ONU 30-1 to the N-th ONU 30-N. In FIG. 1, the second ONU 30-2 to the N-th ONU 30-N are not illustrated. Because the first ONU 30-1 to N-th ONU 30-N all have the same structure, the structure thereof will be described taking the first ONU 30-1 as an example.

The first ONU 30-1 generates a transmission frame that includes a discovery time interval and a transmission frame that does not include a discovery time interval to serve as upstream signals. The first ONU 30-1 is provided with a transmission frame switching section 30-1-1 that selects one of the frames and sets the same to be upstream signals.

Next, structure of the central office 10 will be described with reference to FIG. 2. FIG. 2 is a schematic structural block diagram of the central office 10 provided with the synchronized CDM communication system of the exemplary embodiment of the present invention.

The central office 10 is provided with a transmission section 40, a reception section 42, and a control section 44 for controlling the transmission section 40 and the reception section 42.

The central office 10 is further provided with a clock generator 72 that generates a clock signal as a reference for operations of the transmission section 40, the reception section 42 and the control section 44. The clock signal generated and outputted by this clock generator 72 is extracted by a clock extractor 120 provided at each of the first ONU 30-1 to N-th ONU 30-N mentioned above. The extracted clock signals serve as reference signals for operations of the first ONU 30-1 to N-th ONU 30-N.

The transmission section 40 is provided with a frame generator 50 which generates a transmission frame including a discovery time interval, a frame generator 52 which generates a transmission frame not including a discovery time interval, a transmission frame switching switch 54, a data accommodation component 56, a header generator 58, a header assignment component 60, a control signal generator 62, a control signal assignment component 64, an encoder 10-4, and a delay component 66. The encoder 10-4 encodes downstream signals that are sent from the central office 10 to the first ONU 30-1 to N-th ONU 30-N.

The reception section 42 is provided with a decoder 10-5, a gate processor 78, a delay component 80, a synchronization bit pattern detector 82 and a header remover 74. The reception section 42 illustrated in FIG. 2 is shown only for a receiver function portion corresponding to the ONU 30-1, to which a first channel is assigned. Accordingly, the reception section 42 illustrated in FIG. 2 is not shown for receiver function portions corresponding to the second ONU 30-2 to N-th ONU 30-N, to which second to N-th channels, respectively, are assigned. The decoder 10-5 decodes upstream signals that have been sent from the respective first ONU 30-1 to N-th ONU 30-N to the central office 10. The decoder 10-5 is a decoder corresponding to the first channel. To illustrate this, the decoder 10-5 is shown as decoder-C1 in FIG. 2.

The control section 44 is provided with a microprocessor (MPU) 70 and a storage section 68. The microprocessor 70 is provided with a presence check section, a ranging processing section, a connection state acquisition section and a header analysis section. These sections are realized by the execution of programs. Reference information that is required for identification, comparison, determination and the like in these sections may be saved in the storage section 68 by the programs and read at arbitrary times when required. The reference information is determined in advance at a time of design of the system, and may be incorporated in the programs.

The clock signal generated and outputted by the clock generator 72 serves as a reference signal for operations of the microprocessor 70 that is provided with the presence check section, the ranging processing section, the connection state acquisition section and the header analysis section.

The transmission frame switching switch 54 provided at the transmission section 40 has a function for selecting and switching between the transmission frame including the discovery time interval and the transmission frame not including the discovery time interval. The data accommodation component 56 gathers downstream signal data up to the payload of a frame that is to be outputted from the transmission frame switching switch 54. The header generator 58 generates and outputs a header for specifying the ONU that is the destination to which the downstream signal is to be transmitted. The header assignment component 60 assigns the header provided from the header generator 58 to the frame outputted from the transmission frame switching switch 54. The control signal generator 62 signalizes and outputs instructions such as transmission pauses and the like. The control signal assignment component 64 packs a control signal provided from the control signal generator 62 in the header of the frame outputted from the transmission frame switching switch 54. The delay component 66 adjusts a transmission timing of the frame, which is encoded and outputted from the encoder 10-4, and transmits the frame.

The downstream signaling frame outputted from the delay component 66 is added to signal frames of other channels by an accumulator 84, and a CDM transmission frame is generated. Then, the CDM transmission frame is converted to an optical transmission frame by an optoelectronic converter 86, is inputted to the common transmission line 22, and is transmitted to the ONUs.

A CDM frame, in the form of an optical signal in which upstream signal frames of plural channels transmitted from the ONUs are multiplexed, is inputted to an optoelectronic converter 90 and is converted to CDM frames in the form of electronic signals. The CDM frames in the form of electronic signals that are outputted from the optoelectronic converter 90 are distributed by a splitter 88, and inputted to the respective reception sections to which the first to N-th channels are assigned. In FIG. 2, the reception section 42 to which the first channel is assigned is illustrated as a representative case.

The gate processor 78 provided at the reception section 42 isolates a time slot on the time axis to which the first channel is assigned from received frames that are decoded and outputted from the decoder C 1, and extracts and outputs the frame of the first channel. The header remover 74 removes the header of the decoded frame of the first channel that is outputted from the gate processor 78, and generates and outputs a reception signal. Gating processing by the gate processor 78 is implemented with a synchronization bit pattern outputted from the delay component 80 serving as a reference. The synchronization bit pattern detector 82 extracts synchronization bit patterns from the frames of the first channel and provides the same to the delay component 80.

A decoded frame of the first channel that is outputted from the gate processor 78, which branches from a signal branching component 76, is provided to the microprocessor 70 provided at the control section 44, and used for analysis of the header.

The structure of the first ONU 30-1 will be described with reference to FIG. 3. FIG. 3 is a schematic structural block diagram of the first ONU 30-1 provided at the synchronized CDM communication system of the exemplary embodiment of the present invention. Because the first ONU 30-1 to N-th ONU 30-N all have the same structure, the structure thereof will here be described taking the first ONU 30-1 as an example.

The first ONU 30-1 is provided with a reception section 46, a transmission section 48 and the clock extractor 120. The clock extractor 120 extracts a clock signal from the downstream signal onto which the clock signal generated by the clock generator 72 has been loaded. Thus, the clock signal extracted by the clock extractor 120 is synchronized with the clock signal generated by the clock generator 72. Hence, the extracted clock signal serves as a reference signal for operations of the reception section 46 and transmission section 48 provided at the ONU 30-1.

The reception section 46 is provided with a decoder 30-1-3, a gate processor 106, a header analyzer 108, a synchronization bit pattern detector 110, a delay component 112 and a header remover 114.

A CDM reception frame in which the downstream signals transmitted from the central office 10 are multiplexed is inputted to an optoelectronic converter 102 and converted to CDM reception frames in the form of electronic signals. The CDM frames in the form of electronic signals, that are outputted from the optoelectronic converter 102, are distributed by a splitter 104 to serve as a CDM reception frame to be inputted to the reception section 46 and a CDM reception frame, for clock signal extraction.

The CDM reception frame for clock signal extraction is inputted to the clock extractor 120, and the clock signal is extracted from the CDM reception frame. Meanwhile, the CDM reception frame that is inputted to the reception section 46 is decoded, converted to received data and outputted.

The CDM reception frame inputted to the reception section 46 is inputted to the decoder 30-1-3 and decoded. The decoder 30-1-3 is indicated with decoder-C1, to illustrate that it is a decoder corresponding to the first channel.

A decoded reception data signal frame that is outputted from the decoder 30-1-3 is inputted to the gate processor 106, and gating processing is implemented.

In addition to the reception data signal frame of the first channel, noise components are included in the reception data signal frame that is outputted from the decoder 30-1-3. The noise components are removed by the gate processor 106. That is, the reception data signal frame is inputted to the gate processor 106, subjected to gating processing, and only a frame of a signal received in the first channel is outputted as an extracted reception data signal frame. The reception data signal frame outputted from the gate processor 106 is inputted to the header remover 114, the header is removed, and the frame is reproduced and outputted as received data of the first channel.

The gating processing by the gate processor 106 is implemented with a synchronization signal outputted from the delay component 112 as a reference. The delay component 112 outputs a synchronization signal in which the phase of the signal outputted from the synchronization bit pattern detector 110 is adjusted so as to open a window of the gate processor 106 to match a time slot assigned to the first channel. The synchronization bit pattern detector 110 taps the reception data signal frame with a branching component, generates a synchronization signal from this reception data signal frame, and outputs the synchronization signal.

The transmission section 48 is provided with the transmission frame switching section 30-1-1, a data accommodation component 146, a header generator 130, a header assignment component 132, a control signal generator 126, a control signal assignment component 128, an encoder 30-1-2 and a delay component 124. The transmission frame switching section 30-1-1 is provided with a frame generator 140 which generates a transmission frame including a discovery time interval, a frame generator 142 which generates a transmission frame not including a discovery time interval, and a transmission frame switching switch 144 that switches between the transmission frame including the discovery time interval and the transmission frame not including the discovery time interval.

Header information indicating whether or not downstream signal frames include the discovery time interval is sent from the header analyzer 108 to the transmission section 48. This header information is provided to the transmission frame switching section 30-1-1, the header generator 130, the control signal generator 126 and the delay component 124.

At the transmission frame switching section 30-1-1, the transmission frame switching switch 144 receives the header information provided from the header analyzer 108. If it is reported by the header information that a downstream signal frame includes the discovery time interval, the transmission frame switching section 30-1-1 selects the frame provided from the frame generator 140, which creates frames that include the discovery time interval, and provides this frame to the data accommodation component 146. On the other hand, if it is reported by the header information that a downstream signal frame does not include the discovery time interval, the transmission frame switching section 30-1-1 selects the frame provided from the frame generator 142, which creates frames that do not include the discovery time interval, and provides the frame to the data accommodation component 146.

Upstream signal data to the payload of the frame including the discovery time interval or the frame not including the discovery time interval, which is provided from the transmission frame switching switch 144, is loaded from the data accommodation component 146 and provided to the header assignment component 132. The header generator 130 generates a header incorporating the header information provided from the header analyzer 108 and provides the header to the header assignment component 132.

The header assignment component 132 assigns the header provided from the header generator 130 to the frame provided from the data accommodation component 146 and provides the frame to the control signal assignment component 128. The header information provided from the header analyzer 108 is received by the control signal generator 126. The control signal generator 126 provides a transmission control signal based on this header information to the control signal assignment component 128. The control signal assignment component 128 loads the transmission control signal provided from the control signal generator 126 into the header of the frame provided from the header assignment component 132, and provides the frame to the encoder 30-1-2.

The encoder 30-1-2 encodes the downstream transmission frame provided from the control signal assignment component 128 and provides the frame to the delay component 124. The delay component 124 adjusts a transmission timing of the encoded downstream transmission frame, in accordance with the header information provided from the header analyzer 108, and provides the frame to an optoelectronic converter 122. The optoelectronic converter 122 converts the encoded downstream transmission frame, provided from the delay component 124, into the form of optical signals, and transmits the optical signals to the central office 10.

The commercial components illustrated in Table 1 may be suitably employed for the optoelectronic converters that convert electronic signals to optical signals (E/O converters) 86 and 122, the optoelectronic converters that convert optical signals to electronic signals (O/E converters) 90 and 102, the clock generator 72, the clock extractor 120, the decoders 10-5 and 30-1-3, the encoders 10-4 and encoder 30-1-2 and the gate processors 78 and 106, with which the above described central office and ONUs are provided.

Detailed specifications of charge coupled device (CCD) correlators that may preferably used as the decoders 10-5 and 30-1-3 are disclosed in "Technical Report of IEICE. RCS", Vol. 97, No. 266 (1997 Sep. 24), pp. 57-62. In Table 1, a burst semiconductor laser driver is abbreviated to "burst LD driver" (laser diode), a phase synchronized loop circuit is abbreviated to "PLL" (phase lock loop), a voltage controlled oscillator is abbreviated to "VCO", a clock extractor is abbreviated to "CDR" (clock data recovery), a charge coupled device correlator is abbreviated to "CCD correlator", and a delay flip-flop is abbreviated to "D-FF".

TABLE 1

| Structural element | Component | Model and spec. | Commercial source |
|---|---|---|---|
| O/E converter | Photodiode | OF3634B-C3 | OKI |
| E/O converter | Burst LD driver | MAX3656 | MAXIM |
| | Semiconductor laser | OL5453L-2 | OKI |
| Clock generator | Liquid crystal oscillator | OC type crystal oscillator | TAITIEN |
| | PLL | ADF4112 | Analog Devices |
| | VCO | VCO190-2050T | VARI-L COMPANY |
| Clock extractor | CDR | ADN2812 | Analog Devices |
| Decoder/encoder | CCD correlator | Document 1 | New Japan Radio Co., Ltd. |
| Delay component | Variable delay device | MC100EP195 | ON Semiconductor |
| Gate processor | Comparator | MAX9602 | MAXIM |
| | D-FF | MC100EP52 | ON Semiconductor |

Figure 4:
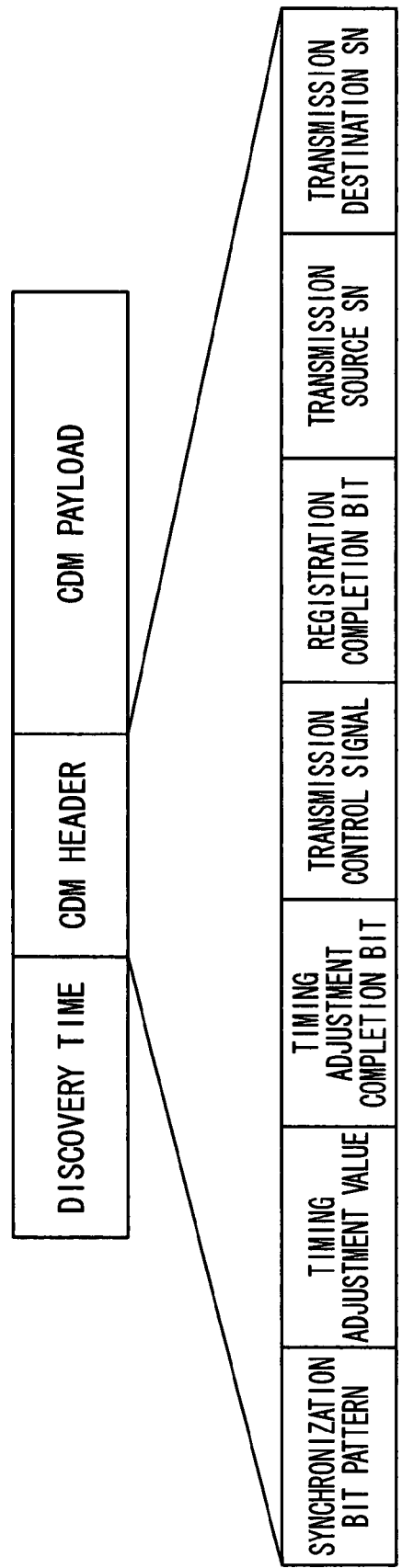
FIG. 4 is a diagram for describing the configuration of a transmission frame.

For convenience of explanation hereafter, the configuration of a transmission frame used in the synchronized CDM communication of the exemplary embodiment of the present invention will now be described with reference to FIG. 4. FIG. 4 is a diagram for describing the configuration of the transmission frame.

In the case in which the discovery time interval is included, the transmission frame is configured to include the discovery time interval, the header and the payload. In the case in which the discovery time interval is not included, the transmission frame is configured to include the header and the payload, without a portion corresponding to the discovery time interval.

The transmission frame illustrated in FIG. 4 is a frame in which transmission frames of respective channels are encoded and multiplexed. Therefore, to be precise, it is a CDM transmission frame. Further, the portion corresponding to the discovery time interval, the header and the payload are also encoded. Accordingly, in FIG. 4, the header is labeled "CDM header" and the payload is labeled "CDM payload". However, for convenience in the following descriptions, rather than "CDM header" and "CDM payload", these are simply denoted as "header" and "payload".

A synchronization bit pattern, a timing adjustment value, a timing adjustment completion bit, a transmission control signal, a registration completion bit, a transmission source serial number and a transmission destination serial number are held in the header. Hereinafter, "serial number" may be shortened to "SN".

A two-bit portion is provided for a portion holding the transmission control signal. The portion accommodating the transmission control signal instructs the functions illustrated in Table 2, by the first bit and second bit of the two-bit portion respectively being '0' or '1'.

TABLE 2

| First bit | Second bit | Command |
|---|---|---|
| 0 | 0 | Pause transmission |
| 0 | 1 | ACK request |
| 1 | 0 | Start data communication (without discovery time interval) |
| 1 | 1 | Start data communication (with discovery time interval) |

That is, if the portion holding the transmission control signal is '00', this section that a pause in transmission is being instructed. If the portion holding the transmission control signal is '01', this means that an ACK (acknowledgement) request is being performed. If the portion holding the transmission control signal is '10', this indicates that communication is to start, with frames not including the discovery time interval. If the portion holding the transmission control signal is '11', this indicates that communication is to start, with frames including the discovery time interval.

<Synchronized CDM Communication Method>

Figure 5:
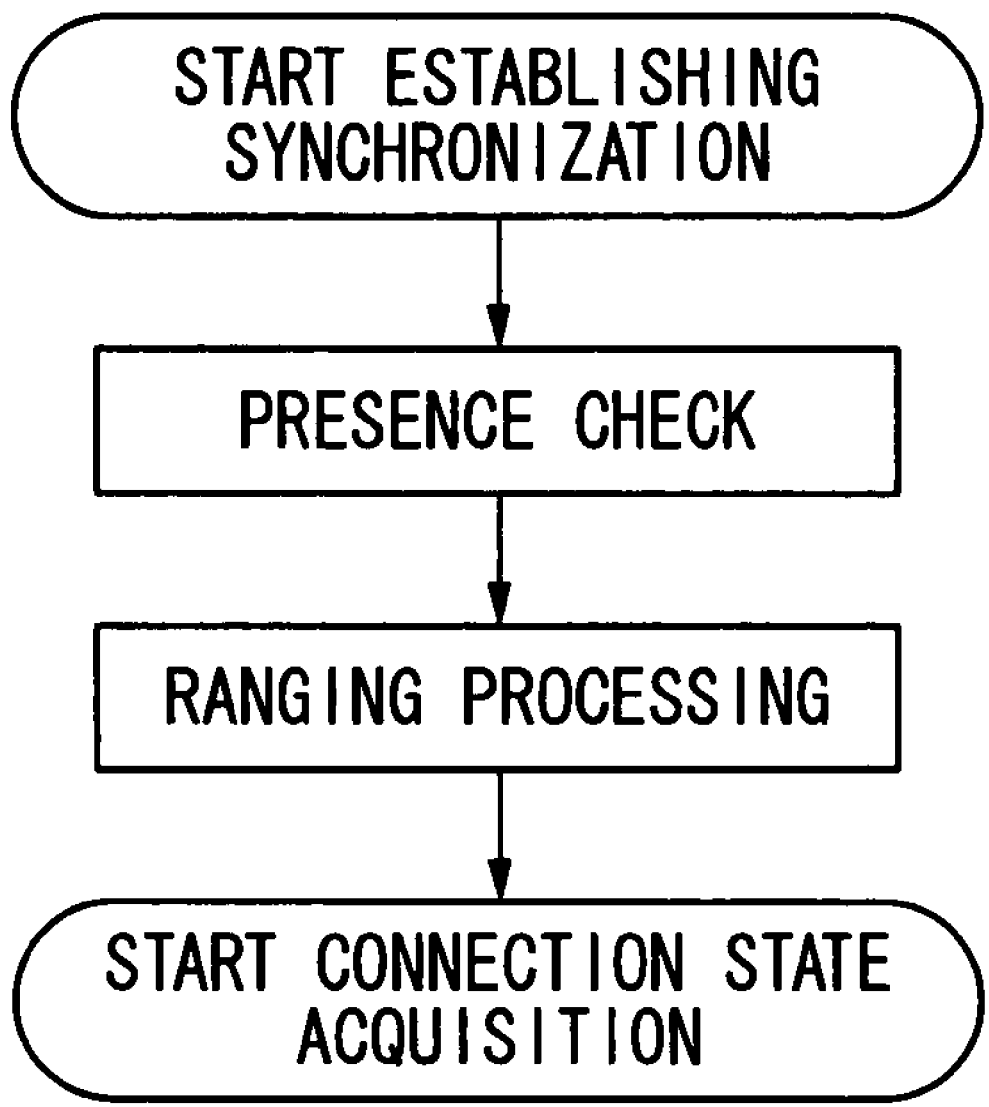
FIG. 5 is a flowchart illustrating a flow from establishing synchronization until the commencement of synchronized CDM communication, in a synchronized CDM communication method utilizing the synchronized CDM communication system according to the exemplary embodiment of the present invention.

Firstly, steps from the establishment of synchronization to the start of synchronized CDM communication, in the synchronized CDM communication method that utilizes the synchronized CDM communication system of the exemplary embodiment of the present invention, will be described with reference to FIG. 5. FIG. 5 is a flowchart illustrating the flow from establishing synchronization until the commencement of synchronized CDM communication.

"The steps from establishing synchronization until the start of synchronized CDM communication" refers to steps from the presence check step through the ranging processing step to the start of the connection state acquisition step. When the connection state acquisition step has begun, usual communications are implemented. That is, the connection state acquisition step is continuously executed while usual synchronized CDM communication is being performed.

Each step from the establishment of synchronization to the start of synchronized CDM communication—the presence check step and the ranging processing step—is executed by the control section 44 of the central office 10. As will be described later, the presence check step and the ranging processing step are also both executed in the connection state acquisition step.

In each of the presence check step and ranging processing step illustrated in FIG. 5, the configuration of frames that are exchanged between the central office 10 and the first ONU 30-1 to N-th ONU 30-N is the same configuration as frames when data communication is performed in the state in which the discovery time interval is not included. Hereafter, where there is little need to refer to FIG. 2 and FIG. 3 in particular, for the sake of simplicity, the central office 10 is denoted simply as the "central office" and the first ONU 30-1 to N-th ONU 30-N are denoted simply as "ONUs".

The central office uses ACK requests to perform requests, with serial numbers and response signals of the transmission destination ONUs being transmitted in the headers, and carries out communication individually with the plural ONUs that are connected. For example, a ONU with the serial number 1011110 is in the connected state with the central office, and an ACK request to this ONU is performed. In this case, the central office sets the transmission destination serial number of a downstream transmission frame to 1011110, and sets the transmission control signal that is incorporated as a two-bit signal in the header of the downstream transmission frame to 01. All of the payload, header and discovery time interval constituting the transmission frame are encoded, and the transmission frame is transmitted.

Accordingly, ONUs that receive the downstream transmission frame transmitted from the central office check the destination in two stages, confirmation by decoding of the frame and confirmation by the serial number.

<Procedure of Presence Check>

The presence check step carries out a check of the ONUs that are connected with the central office and the ONUs that are not connected, on the basis of whether or not response signals transmitted from the ONUs are received by the central office. In the presence check step, confirmation of the ONUs that are in the connected state with the central office is implemented, and the serial numbers of each of the ONUs that are in the connected state, and of ONUs that are in states of not being connected, are stored in the storage section 68 provided at the control section 44 of the central office.

ONUs for which connection with the central office is possible in hardware terms are stored in the storage section 68 in the form of a list. A description will be given assuming, as an example, a case in which the number of ONUs for which connection with the central office is possible in hardware terms is sixteen. The numbers 1 to 16 and binary numbers corresponding with the numbers 1 to 16 are registered in the storage section 68 as serial numbers of the ONUs, as is illustrated in table 3.

TABLE 3

| No. | ONU-SN | Connection state |
|---|---|---|
| 1 | 0000 | 1 |
| 2 | 0001 | 0 |

TABLE 3-continued

| No. | ONU-SN | Connection state |
|---|---|---|
| 3 | 0010 | 1 |
| 4 | 0011 | 1 |
| 5 | 0100 | 0 |
| ... | ... | ... |
| 15 | 1110 | 1 |
| 16 | 1111 | 1 |

1: Connected
0: Not connected

In the presence check step, ACK requests are carried out sequentially, from the terminal whose serial number is 0000 to the terminal whose serial number is 1111. When a response signal to an ACK request is returned, it is determined that that ONU is in the connected state with the central office, and the connection state for serial number 0000 in the storage section 68 is set to '1'. In this case, it is defined beforehand that '1' is assigned to those in the connected state and '0' is assigned to those not in the connected state. This definition falls within matters of design; a system design might be implemented in which it is conversely defined that '0' is assigned to those in the connected state and '1' is assigned to those not in the connected state.

The information in which the presence or absence of the connected state is stored as ones and zeros in the storage section 68 as described above, is read by reading the transmission source serial numbers in the headers of frames that are transmitted from the ONUs. The storage section 68, accordingly, memorizes both the serial numbers of the ONUs that are in the connected state with the central office and the serial numbers of the ONUs that are not in the connected state with the central office. The information on the presence or absence of the connected state with the central office that is stored in the storage section 68 in the presence check step is to be utilized in the connection state acquisition step, which is described later.

Figure 6:
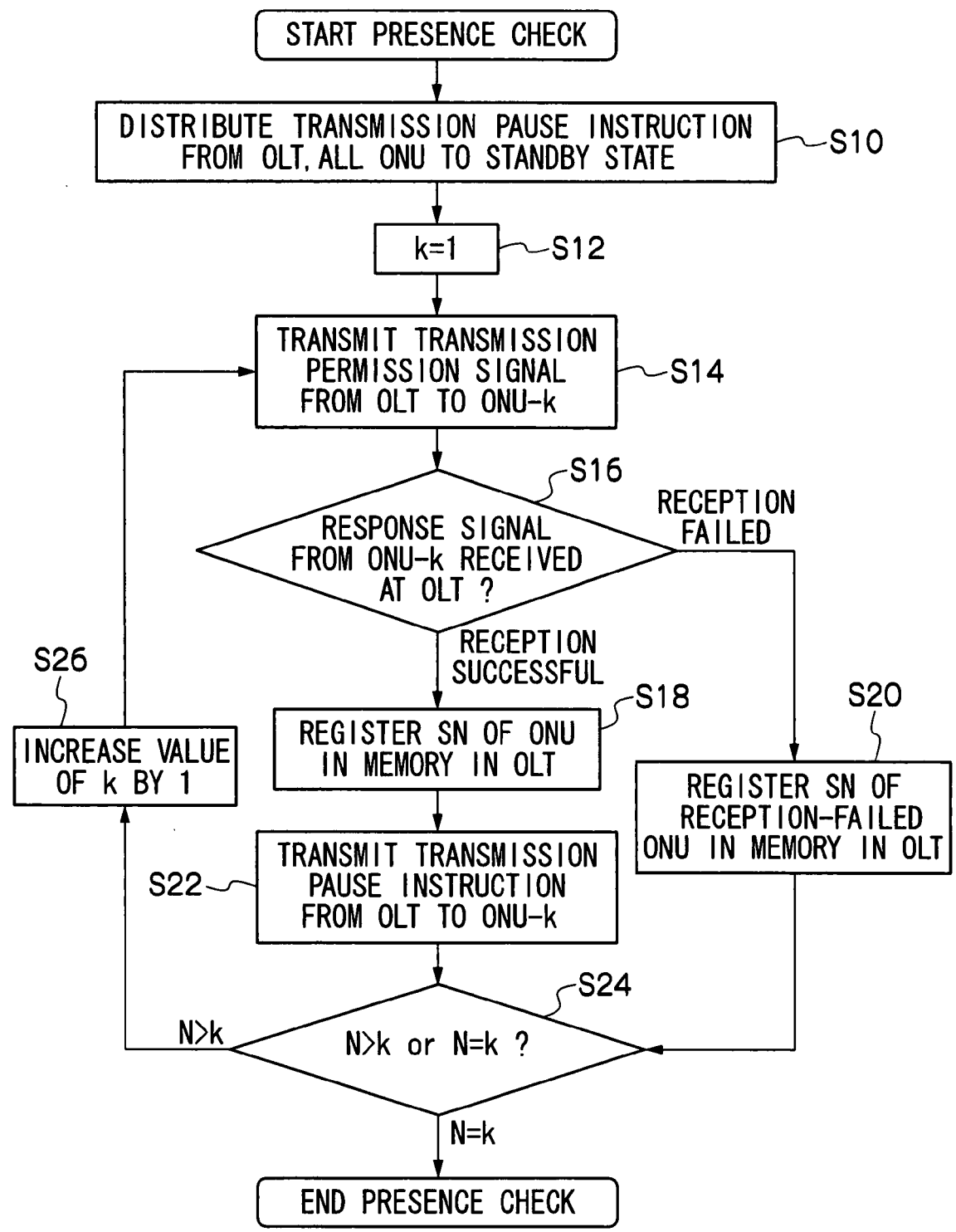
FIG. 6 is a flowchart of a presence check step.

The presence check step will be described with reference to FIG. 6 and FIG. 2. FIG. 6 is a flowchart of the presence check step.

When the presence processing begins, a presence check section of the control section 44 provided at the central office operates, and a program that implements the presence function is read out from the storage section 68. In accordance with this program, first, the control system of the control section 44 operates, and a control signal for executing step S10 is sent to the transmission section 40. This control signal is sent to the transmission frame switching switch 54, the header generator 58, the control signal generator 62 and the delay component 66 provided at the transmission section 40.

When the transmission section 40 receives the control signal for executing step S10, step S10 is executed, which distributes transmission pause instructions from the central office to all of the first to N-th ONUs, and sets all of the first to N-th ONUs into a standby state. Then, continuing from step S10, step S12 is executed, which sets a value k to 1. In step S12, the presence check section of the control section 44 provided at the central office operates, and the value of k in a presence processing parameter setting memory of the storage section 68 is set to 1. Herein, k is a parameter that takes all integer values from 1 to N.

The presence check section of the control section confirms the end of step S12 by setting the value of k in the presence processing parameter setting memory of the storage section 68 to 1. Then step S14 is executed, which transmits a transmission permission signal from the central office to the k-th ONU. Initially, because k=1, the transmission permission signal is transmitted to the first ONU. If the first ONU is in the connected state with the central office, this transmission permission signal is received by the first ONU.

At the first ONU, the header analyzer 108 detects that the transmission permission signal has been transmitted from the central office, and the transmission control signal is sent to the transmission section 48 provided at the first ONU. The transmission section 48 receives this transmission control signal and generates a response signal, and transmits the response signal to the central office.

At the central office, step S16 is executed, which determines whether or not a response signal has been received from the k-th device terminal. When k=1, it is determined whether or not a response signal has been received from the first device terminal. If a response signal is received, a reception confirmation signal is generated by the header analysis section provided at the control section 44 of the central office, and step S18 is executed by the presence check section, which registers the k-th device terminal as a ONU that is connected. If a response signal is not received, step S20 is executed, which registers the k-th device terminal as a device terminal that is not connected.

The operations of registration of serial numbers of ONUs in step S18 and step S20 are carried out by the storage section 68 as described above. The serial numbers of connection devices which are in the connected state with the central office and the serial numbers of device terminals which are not in the connected state with the central office are stored in the storage section 68.

When step S18 has been executed, step S22 is executed, which transmits a transmission pause instruction to the k-th device terminal. Initially, because k=1, the transmission pause instruction is transmitted to the first device terminal. Here, k is a parameter that takes all integer values from 1 to N.

Then step S24 is executed, which determines whether or not the value of k equals the value of N. While the value of k is not equal to the value of N, step S26 is executed, which increases the value of k by one and sets it to k+1. In this manner, steps S14, S16, S18, S20 and S22 are repeatedly executed until the value of k is equal to the value of N. At the time when the value of k is equal to the value of N, the presence check step ends.

<Procedure of Ranging Processing>

The ranging processing step carries out ranging for the ONUs that have been confirmed as being ONUs that are in the connected state with the central office in the presence check step. That is, the ranging processing step is a step that, for ONUs that have been confirmed as being in the connected state with the central office, adjusts the transmission timings of upstream signals from these ONUs.

A measurement of a transmission delay duration that is required to adjust the transmission timing is carried out, with the time at which the central office receives a response signal transmitted from the ONU to the central office serving as a reference. That is, the transmission delay duration required for adjusting the transmission timing is determined by measuring a time interval from the moment at which a transmission permission signal is transmitted from the central office to the ONU until the moment at which the central office receives the response signal.

Figure 2:
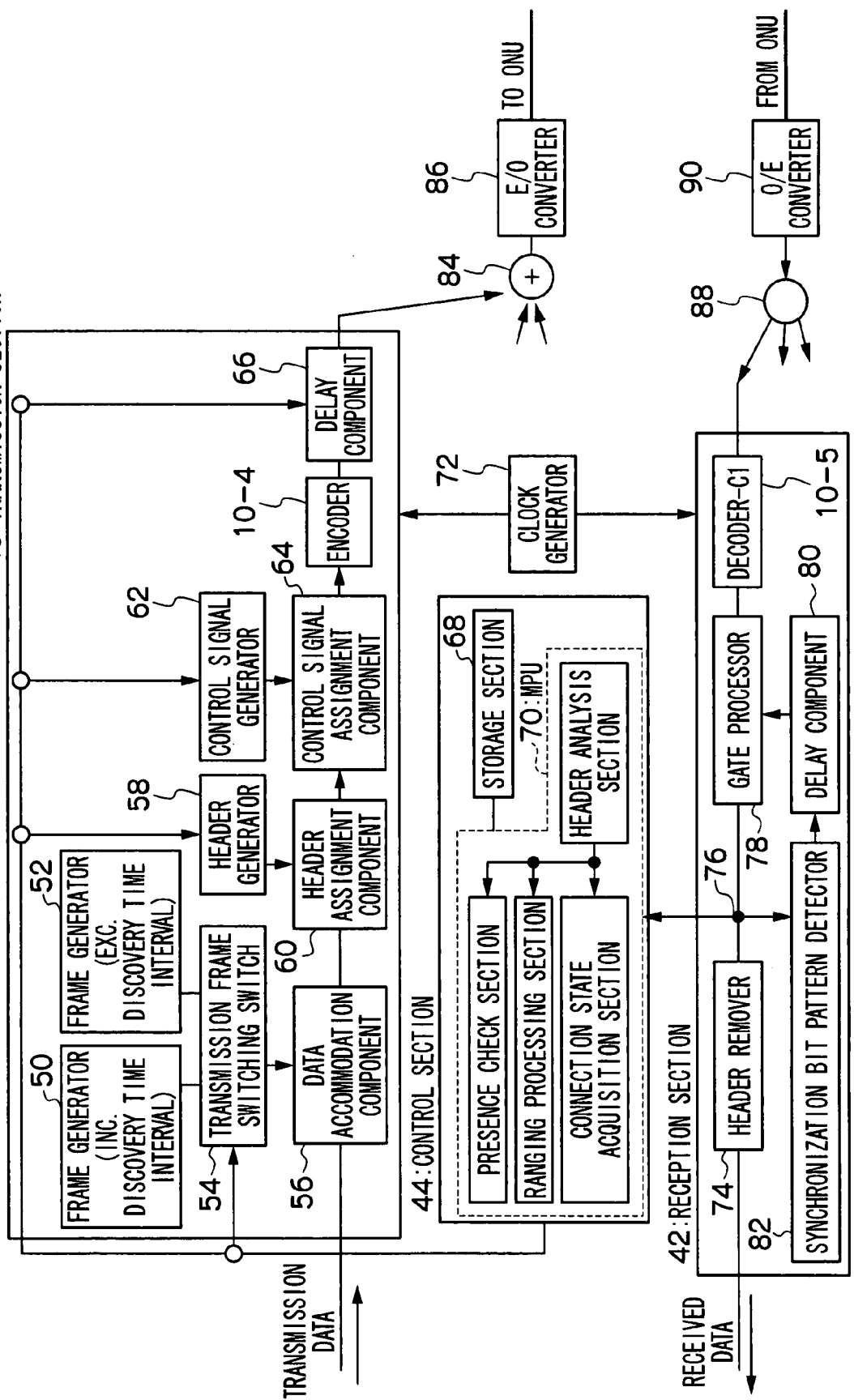
FIG. 2 is a schematic structural block diagram of a central office provided at the synchronized CDM communication system according to the exemplary embodiment of the present invention.
Figure 3:
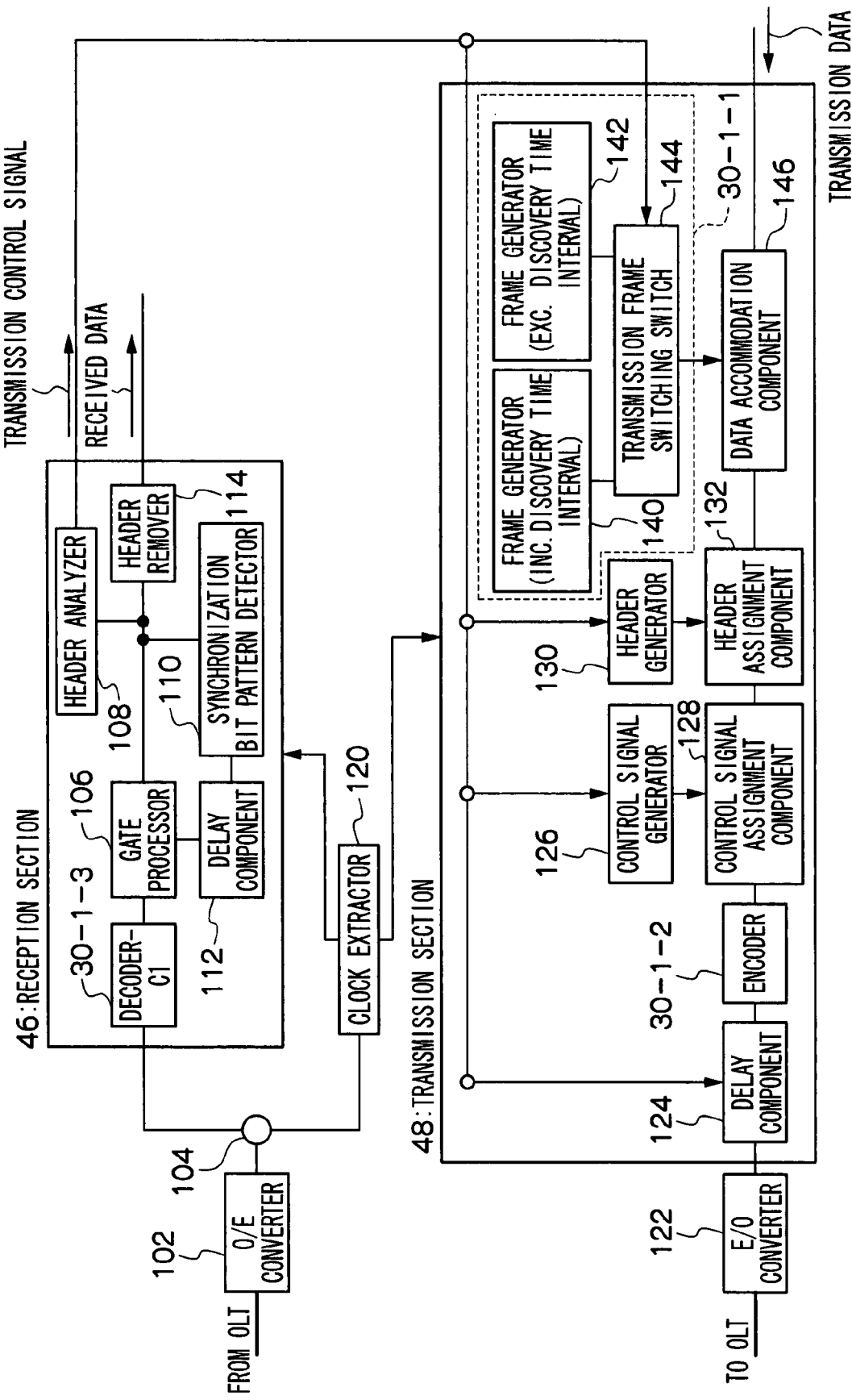
FIG. 3 is a schematic structural block diagram of a first ONU provided at the synchronized CDM communication system according to the exemplary embodiment of the present invention.

The moment at which the central office receives the response signal is defined by the time at which a synchronization bit pattern in the header provided in a frame that configures the response signal is detected by the synchronization bit pattern detector 82 provided at the reception section 42 (see FIG. 2). In practice, a transmission delay duration is required to adjust the transmission timing, which is defined for each of the ONUs. The transmission delay durations are determined with the measured time at which the response signal is received from one of the ONUs that have been confirmed as being in the connected state with the central office serving as a reference.

The response signal reception time of which ONU is to serve as the reference may be arbitrarily determined. It is necessary to specify relative delay durations of the ONUs that are in the connected state. By specifying respective delay durations for the ONUs, it may be specified that upstream signals transmitted from all the ONUs to the central office arrive simultaneously at the optical splitter (the optical splitter 20 illustrated in FIG. 1).

Figure 7:
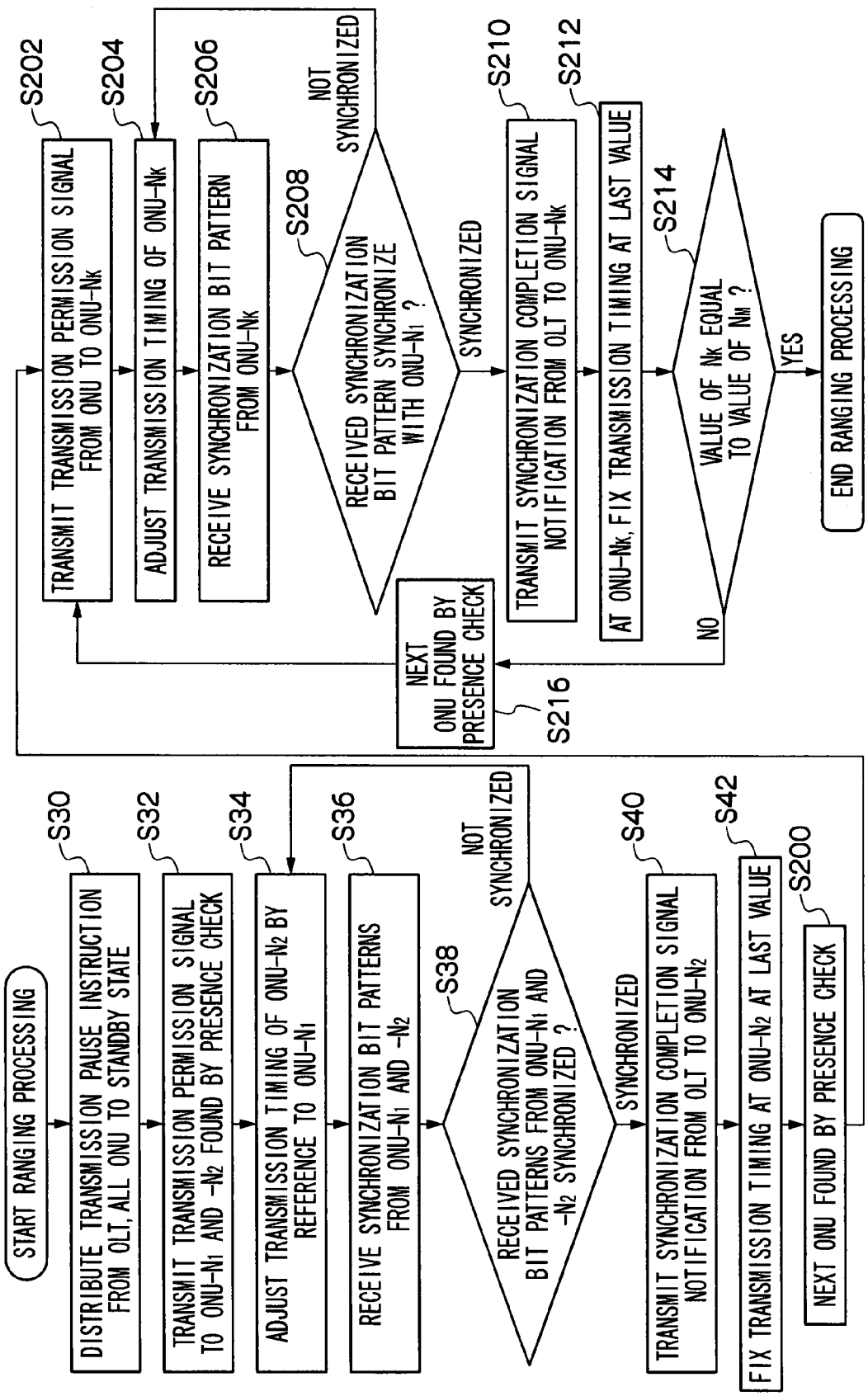
FIG. 7 is a flowchart of a ranging processing step.

The ranging processing step will be described with reference to FIG. 7 and FIG. 2. FIG. 7 is a flowchart of the ranging processing step.

When the ranging processing begins, the ranging processing section of the control section 44 provided at the central office operates, and a program that executes the ranging processing is read out from the storage section 68. In accordance with this program, the control system of the control section 44 operates, and a control signal for executing step S30 is sent to the transmission section 40. This control signal is sent to the transmission frame switching switch 54, the header generator 58, the control signal generator 62 and the delay component 66 provided at the transmission section 40.

A reassignment of the serial numbers of the ONUs from which response signals were received in the presence check step to serial numbers in order from the smallest, ONU $N_1$ to ONU $N_M$, is performed. Here, M is a parameter that takes integer values that are smaller than N, from 1.

The reassignment of serial numbers may reassign the serial numbers from the smallest serial number of a ONU that has been confirmed as being in the connected state with the central office and has a '1' registered as the connection state in the storage section 68, in the order $N_1, N_2, \ldots, N_M$. Here, $N_1 < N_2 < \ldots < N_M$. That is, ONU $N_1$ may be set as a first ONU, ONU $N_2$ set as a second ONU, . . . , and ONU $N_M$ may be set as an M-th ONU.

When the transmission section 40 receives the control signal for executing step S30, the central office distributes transmission pause instructions to all of the first to $N_M$-th ONUs. Then the central device sets all of the first to $N_M$-th ONUs into standby states.

Next, ONU $N_1$ and ONU $N_2$ are selected from the ONUs from which response signals have been received. This selection is carried out by the ranging processing section of the control section 44 operating and transmitting synchronization bit patterns in the headers of transmission permission signal frames, designating the serial numbers that correspond to ONU $N_1$ and ONU $N_2$.

An instruction specifying the synchronization bit pattern in the header of a transmission permission signal frame is implemented by a control signal being sent from the ranging processing section of the control section 44 to the transmission section 40 in accordance with the program that executes the ranging processing. As a result, step S32 is executed, which transmits the transmission permission signals from the central office to ONU $N_1$ and ONU $N_2$.

Continuing from step S32, step S34 and step S36 are executed in sequence, adjusting the transmission timing of ONU $N_2$ with the ONU $N_1$ as the reference. For the adjustment of the transmission timing, as described above, a transmission delay time required for adjustment of the transmission timing is determined by measuring the time interval from the moment at which a transmission permission signal is transmitted from the central office to the ONU until the moment at which the central office receives the response signal. Specifically, the adjustment is implemented as follows.

When the response signal from the ONU $N_1$ is synchronized with the response signal from ONU $N_2$, it is confirmed that the synchronization bit pattern specified in the header of the response signal frame from ONU $N_1$ and the synchronization bit pattern specified in the header of the response signal frame from ONU $N_2$ are synchronized. This confirmation is implemented by the header analysis section of the control section 44. That is, step S38 is executed, in which it is determined by the header analysis section of the control section 44 whether or not the synchronization bit pattern signal from ONU $N_1$ and the synchronization bit pattern signal from ONU $N_2$ are synchronized.

While synchronization is not confirmed in step S38, the program returns to step S34, and when synchronization is confirmed, the program advances to step S40.

Step S40 transmits a synchronization completion signal from the central office to ONU $N_2$. In this step, a control signal notifying that the synchronization bit pattern signals have synchronized is sent to the transmission section 40 by the ranging processing section of the control section 44. A frame constituting the synchronization completion signal is generated in the transmission section 40 on the basis of this control signal, and is sent to ONU $N_2$.

When it is confirmed by the header analyzer provided at the reception section of ONU $N_2$ (the header analyzer 108 illustrated in FIG. 3) that a frame constituting the synchronization completion signal has been received at ONU $N_2$, step S42 is executed, in which a delay amount set at the delay component provided at the transmission section (the delay component 124 illustrated in FIG. 3) is determined, and hence the transmission timing is fixed at this last value.

At the time when step S42 ends, the program advances to step S200, which carries out similar ranging processing for the ONU with the next serial number from the ONU whose transmission timing has been fixed at the last value. In the process of the loop processing configured by step S202 to step S216, for all the ONUs $N_3$ to $N_M$ for which response signals have been received, the steps from step S32 to step S42 are carried out sequentially but with the ONUs $N_3$ to $N_M$ being sequentially substituted for ONU $N_2$. Due thereto, in the process of the loop processing, the ranging processing is executed for the ONUs $N_3$ to $N_M$. These processes are substantially the same as the above-described process of step S30 to step S42, and duplicative descriptions will not be given.

In step S214, it is determined whether or not the value $N_k$ of the ONU serial number is equal to the value of $N_M$. Details of the step are similar to step S24 of the presence check step described earlier.

<Procedure of Connection State Acquisition Processing>

The connection state acquisition step and the transmission frame switching step acquire states of connection of the ONUs with the central office, and in response to the connection states, switch the frames that are used for bi-directional communication between the central office and the ONUs between the frames including the discovery time interval and the frames not including the discovery time interval.

In accordance with a case in which the synchronized CDM communication method of the exemplary embodiment of the present invention is concretely exemplified, the connection state acquisition step and transmission frame switching step are described together. Correspondingly, in the following descriptions, the connection state acquisition step and the transmission frame switching step are suitably described intermingled with one another, with reference to the flowchart illustrated in FIG. 8.

If the number of ONUs in the connected state with the central office is equal to the total number of ONUs provided at the synchronized CDM communications system, there will be no new ONUs coming into communication-possible states after the start of communication. Therefore, the synchronized CDM communication system may start communication with the transmission frames that do not include the discovery time interval. In this case, the 2-bit transmission control signal provided by the transmission frame switching switch 54 is set to '11' by the connection state acquisition section of the control section 44. That is, the first bit is set to '1' and the second bit is set to '1'.

The total number of ONUs provided at the synchronized CDM communication system is hereinafter referred to as the "maximum connection number".

Alternatively, when communication is to be carried out with frames that include the discovery time interval, as in the case described below, the transmission control signal is set to '10'. The transmission frame switching switch 54 determines whether this control signal is '11' or '10', and switches to select a transmission frame.

A control signal the same as the control signal provided to the transmission frame switching switch 54 by the connection state acquisition section is transmitted to the ONUs. At this time, the control signal is incorporated in the headers of transmission frames. At the ONU side, switching of the transmission frame switching switch provided at the transmission section (the transmission frame switching switch 144 illustrated in FIG. 3) is implemented.

As described above, when the number of ONUs in the connected state with the central office is equal to the total number of ONUs provided at the synchronized CDM communication system, the transmission control signal is set to '11'. Therefore, in the synchronized CDM communication system, communication is performed using the transmission frame not including the discovery time interval.

After the start of communication with the frame not including the discovery time interval, in order to respond to a case in which the connection of a ONU that is in the connected state with the central office is terminated during communication, and the connection is reinstated again, the header analyzer of the central office continuously carries out monitoring of serial numbers of the ONUs in the transmission sources held in the headers of the upstream transmission frames. The serial numbers of the ONUs are held in the headers of all upstream transmission frames. Thus, by monitoring the serial numbers held in the headers of the upstream transmission frames, it is possible to ascertain, with the header analyzer of the central office, which ONUs have had the connected state interrupted and which ONUs have had the connected state terminated and gone into a communication-paused state.

The header analysis section provided at the control section 44 of the central office determines that the ONUs whose serial numbers can be identified are continuing in the connected state and are in a communicating state. In contrast, ONUs whose serial numbers cannot be identified are determined to have terminated their connected states and be in the communication-paused state.

A ONU that is determined to be in the communication-paused state is assumed to have had a power supply temporarily turned off and be in a stopped state. After this determination is made, it is expected that the ONU will proceed to request a reconnection-permitted state. At this time, a necessity arises for communication to be performed with the transmission frame that includes the discovery time interval.

Upon switching into an operation mode in which communication is carried out with the discovery transmission frame including the discovery time interval, the connection state acquisition section changes the state of the relevant ONU in the list of connection states of ONUs that is stored in the storage section 68 provided at the control section 44 of the central office, from a '1' indicating connection to a '0' indicating non-connection. When this change is made, it is determined by the connection state acquisition section that the number of connections with ONUs is not at the maximum connection number. Then the transmission frame switching switch switches the transmission frame being used for communication to the transmission frame that includes the discovery time interval.

Until the communication-paused ONU reappears, the header analyzer continues to monitor the serial numbers of the ONUs in the transmission sources held in the headers of the upstream transmission frames.

When the number of connections of ONUs is not at the maximum connection number, communication using the frame including the discovery time interval is begun, in order to respond to a case in which a ONU newly participating in communication appears. At this time, the aforementioned transmission control signal from the control section 44 is changed to '01' by the connection state acquisition section provided at the control section 44, and is sent to the transmission frame switching switch 54 of the central office. As a result, communication using the transmission frame including the discovery time interval begins.

For a ONU that is not in the connected state immediately after communication begins, the central office performs a communication using an ACK request that makes a request such that the serial number of the transmission destination ONU and a response signal are transmitted in the header. The method of the ACK request is that a transmission frame in which ACK request information is held in the header of the transmission frame is transmitted (the same as in the case of the above-described presence check step). If an ACK signal is not returned from the ONU to the central office, an ACK request is performed to the ONU with the next serial number up that is not connected.

If an ACK signal is returned, ranging processing for the ONU that returned the ACK signal is begun. When the ranging processing is complete, the '0' representing the connection state that is stored in the storage section 68 for that ONU is changed to '1', and the synchronization completion notification and serial number registration completion notification are transmitted to that ONU.

If the above sequence of processing is performed and it is confirmed that the number of ONUs in the connected state has reached a number equal to the maximum connection number, the synchronized CDM communication system of the exemplary embodiment of the present invention switches into an operation mode with the transmission frames that do not include the discovery time interval.

Figure 8:
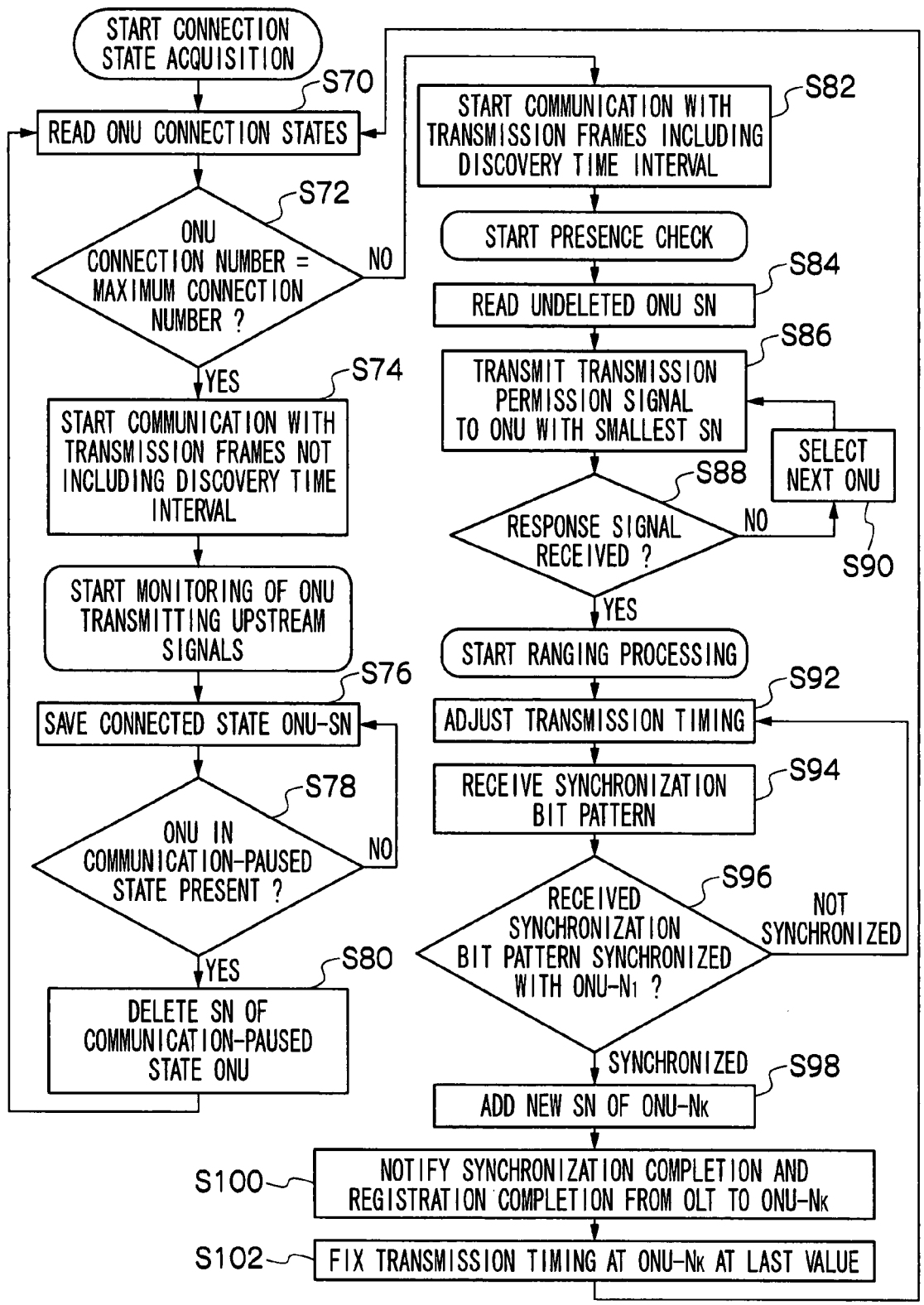
FIG. 8 is a flowchart illustrating a sequence of connection state acquisition processing, including a connection state acquisition step and a transmission frame switching step.

The procedure of the connection state acquisition processing described above will be specifically described with reference to FIG. 8 and FIG. 2. FIG. 8 is a flowchart illustrating the procedure of the connection state acquisition processing, which includes the connection state acquisition step and the transmission frame switching step.

When the connection state acquisition processing begins, the connection state acquisition section of the control section 44 provided at the central office reads out the program that executes the connection state acquisition processing from the storage section 68. In accordance with this program, the control system of the control section 44 operates and sends a control signal for executing step S70 to the transmission section 40. This control signal is sent to the transmission frame switching switch 54, the header generator 58, the control signal generator 62 and the delay component 66 provided at the transmission section 40.

When the transmission section 40 receives the control signal for executing step S70, step S70 is executed, which reads the number of ONUs that were determined to be connected in the presence check step from the storage device provided at the central office. Then step S72 is executed, which determines whether or not the number of ONUs determined to be connected, which has been read in step S70, is equal to N (the maximum connection number).

If it is determined in step S72 that the number of ONUs is equal to N (the maximum connection number), step S74 is executed, which starts communication of frames not including the discovery time interval. When communication is begun in the operation mode with the transmission frames not including the discovery time interval, the header analysis section provided at the control section 44 starts to monitor the ONU serial numbers of upstream signal frames that are being transmitted. Step S76 implements this monitoring function. Step S76 monitors the serial numbers of the ONUs that are the transmission sources of the upstream signals being transmitted to the central office, identifies the ONUs from which upstream signals are being transmitted as being ONUs in the connected state, and saves the serial numbers of these ONUs in the storage section provided at the central office.

Consequent to the execution of step S76, it may be determined whether or not there is a ONU that is in a communication-paused state. In step S78, it is determined whether or not there is a ONU in the communication-paused state.

If the presence of a ONU in the communication-paused state is identified in step S78, then in step S80 the registration of the serial number of the ONU in the communication-paused state is deleted from the storage section provided at the central office.

After step S80 is executed, the program returns to step S70. Hence, as long as it is determined in step S72 that the number of ONUs equals N (the maximum connection number), the loop containing steps S72, S74, S76, S78 and S80 is repeatedly executed.

If it is determined in step S72 that the number of ONUs is less than N (the maximum connection number), step S82 is executed, which starts transmissions of frames including the discovery time interval. When it is determined that the number of ONUs is less than the maximum connection number, this means that, at the point in time at which step S72 is executed, there is a ONU whose connection with the central office has been terminated. Therefore, continuing from step S82, a presence check step is executed.

Accordingly, in step S84, the serial numbers of ONUs not connected with the central office that were confirmed in the presence check step are read out from the storage section. Then, in step S86, a transmission permission signal is transmitted from the central office to, of the ONUs that are not connected with the central office, the ONU with the smallest serial number.

The transmission permission signal transmitted from the central office in step S86 is received by ONUs that are in the connected state with the central office. A ONU that receives the transmission permission signal transmits a response signal. In step S88, this response signal is received at the central office.

If such a response signal is not received at the central office, the ONU to which the transmission permission signal was transmitted is in a state in which the connection has been terminated. In this case, in step S90, the ONU that has the next serial number up from the serial number of the ONU to which the transmission permission signal was transmitted in step S86 is selected, and the program returns to step S86.

On the other hand, if the response signal is received at the central office, the ONU transmitting this transmission permission signal is in the connected state with the central office. In this case, this ONU is a ONU that, since the initial conditions of communication were first specified, has terminated the connection of the ONU that was in the connected state with the central office during communication, and has returned to the connected state again. At this time, ranging processing for this ONU is necessary. Therefore, in step S92, a transmission timing adjustment is implemented for the ONU(s) whose response signal(s) was/were received in step S88. Then, in step S94, synchronization bit pattern signals are received from these ONUs.

Next, serial numbers are set for the ONUs from which synchronization bit patterns have been received in step S94, in order from the smallest, from ONU $N_1$ to ONU $N_M$. In step S96, it is determined whether or not the synchronization bit pattern received in step S94 is synchronized with the synchronization bit pattern of the ONU $N_1$.

In step S98, when synchronization has been verified, the serial number of the ONU for which the connection was confirmed in step S88 is registered as a new ONU in the storage section. In FIG. 8, the serial number of the ONU that has been confirmed as being synchronized with the synchronization bit pattern of ONU $N_1$ in step S96 is shown as being $N_k$. A loop including steps S92, S94 and S96 is carried out for all of the ONUs for which response signals were confirmed in step S88. Therefore, the value of the parameter $N_k$ takes values from 2 up to the total number of ONUs for which synchronization bit patterns have been received in step S94.

Continuing from step S98, a synchronization completion notification and a serial number registration completion notification are performed from the central office to the ONU whose connection was confirmed in step S88 (step S100). At the ONU whose connection was confirmed in step S88, the timing value is fixed at the last value (step S102).

If, in step S72, the number of ONUs determined as being connected equals the maximum connection number N, the program advances to step S74. However, if the same are not equal, the program advances to step S82. If, in step S78, there is a ONU in the communication-paused state, the program advances to step S80. However, if there are none of the same, the program advances to step S76. If, in step S88, a response signal is received from the ONU at which the transmission permission signal was transmitted, the program advances to step S92. However, if none is received, the program advances to step S90. If, in step S96, synchronization is determined, the program advances to step S98. However, if no synchronization is determined, the program advances to step S92.

Figure 9:
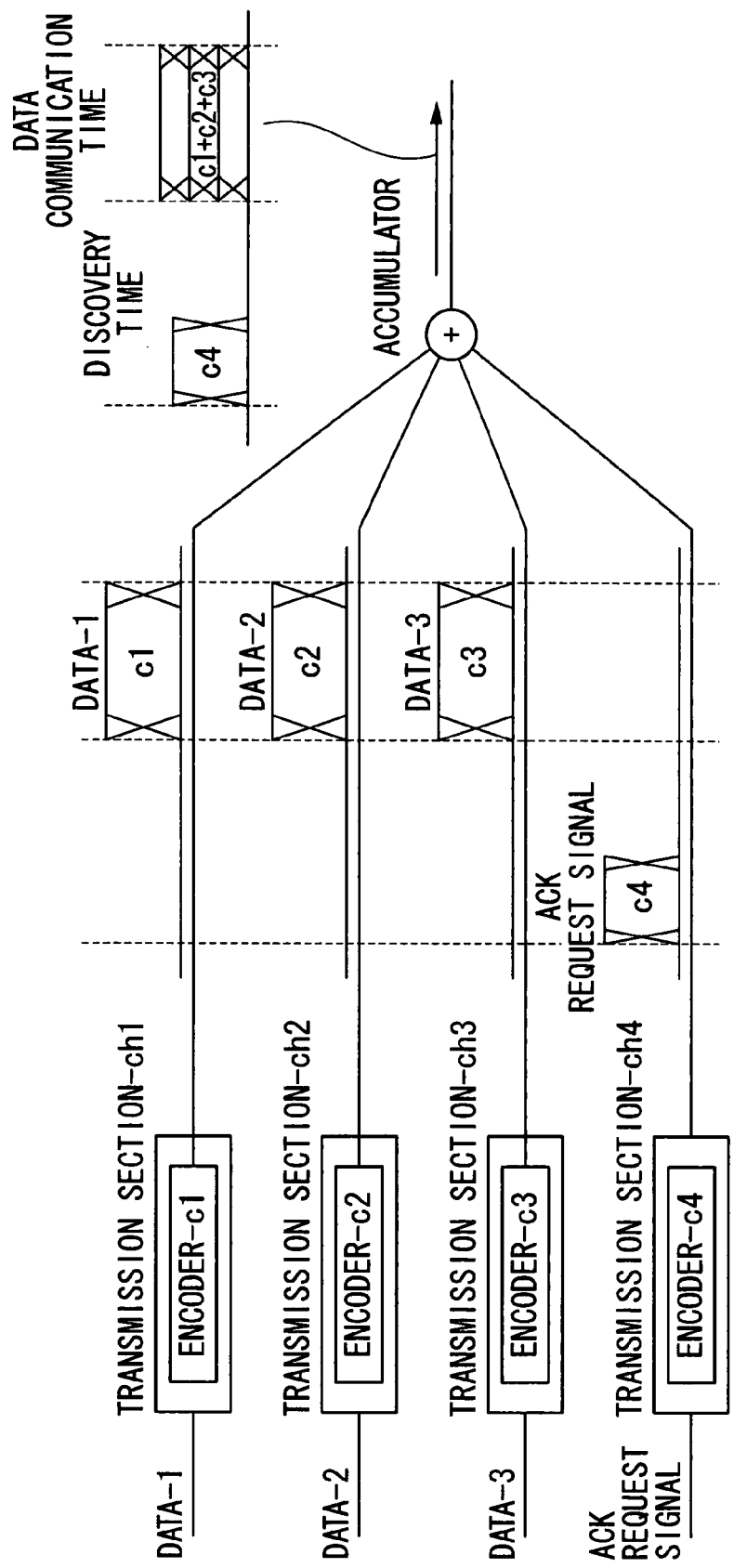
FIG. 9 is a diagram for describing a process of encoding a transmission frame including a discovery time interval.

The process of encoding transmission frames including the discovery time interval will be described with reference to FIG. 9. FIG. 9 is a diagram for describing the process of encoding a transmission frame including the discovery time interval. Connection-capable ONUs are assigned four channels, channel 1 to channel 4, respectively. In the following descriptions, an example of a synchronized CDM communication system is described in which the maximum connection number is 4, for the sake of simplicity. The maximum connection number may be more than this.

In a description of a process in which a response signals returned from a ONU is encoded, which will be described later with reference to FIG. 10, the connection-capable ONUs are again assigned with the four channels channel 1 to channel 4, respectively, and description will be given taking the same synchronization CDM communication system as the example.

FIG. 9 schematically illustrates, simplified, the transmission function portions of the transmission section of the central office to which channels 1 to 4 are assigned. In the aforementioned FIG. 2, only a portion corresponding to one channel of the transmission section 40 of the central office is illustrated, and only structural elements that are the minimum required to be provided as hardware are illustrated. The transmission function portions to which channels 1 to 4 are assigned that are illustrated in FIG. 9 are to be understood as being structures the same as the structure corresponding to one channel that is illustrated in FIG. 2.

In FIG. 9, it is assumed that the ONUs to which channel 1 to channel 3 are assigned are each in the connected state with the central office, and the ONU to which channel 4 is assigned is in the non-connected state. That is, the ONU to which channel 4 is assigned is an object of discovery in the presence check step.

The portion shown as Transmission section-ch4 in FIG. 9 is the transmission function portion of the transmission section of the central office to which channel 4 is assigned.

Channels 1 to 3 carry out data communication in data communication times. In a discovery time, channel 4 sends an ACK request signal frame from the central office to the ONU to which channel 4 is assigned. When the ACK request is to be implemented, no signal at all is transmitted from the central office on channel 4 in the data communication time. Moreover, while discovery processing is being carried out, no signals at all are transmitted from the central office on channels 1 to 3.

The transmission sections to which channels 1 to 4 are assigned encode transmission frames with particular respectively assigned encoding patterns. The respective encoded transmission frames from channels 1 to 4 are multiplexed by the accumulator and outputted to the ONUs. Therefore, during times while discovery processing is being carried out, the transmission function portion to which channel 4 is assigned outputs the ACK request signal frames alone. Meanwhile, during data communication times, data transmission frames are transmitted from each of the transmission function portions to which channels 1 to 3 are assigned.

In FIG. 9, data streams 1 to 3 are outputted from the transmission function portions to which channels 1 to 3 are assigned, respectively. The ACK request signal frame is illustrated as being present in a separate time slot on the time axis from the time slot in which the data transmission frames are present. After being multiplexed by the accumulator, as illustrated in FIG. 9, the data transmission frames which are configured by data streams 1 to 3 being encoded are multiplexed as three channels, while the ACK request signal frame is encoded and is present in a time slot in which these multiplexed frames are not present.

Figure 10:
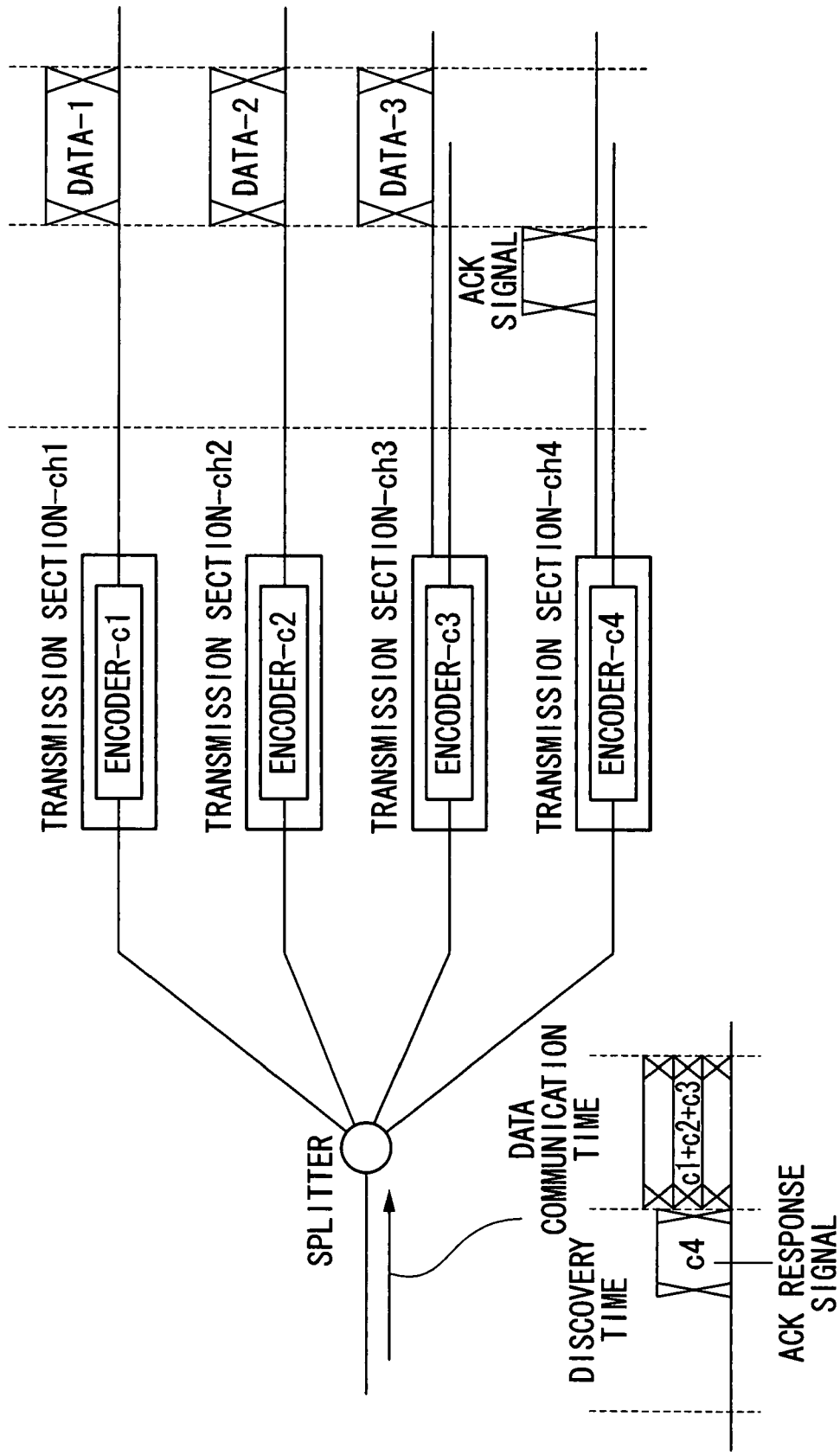
FIG. 10 is a diagram for describing a process of decoding a response signal returned from a ONU.

The process of decoding the response signals returned from the device terminals at the central office will be described with reference to FIG. 10. FIG. 10 is a diagram for describing the process of decoding a response signal returned from a ONU;

FIG. 10 schematically illustrates, simplified, reception function portions of the reception section of the central office to which channels 1 to 4 are assigned, to a scope required for the following description. In FIG. 2, only a portion corresponding to one channel of the reception section 42 of the central office is illustrated, and only structural elements that are the minimum required to be provided as hardware are illustrated. The reception function portions to which channels 1 to 4 are assigned that are illustrated in FIG. 10 are to be understood as being structures the same as the structure corresponding to one channel that is illustrated in FIG. 2.

The portion shown as Reception section-ch4 in FIG. 10 is the reception function portion of the reception section of the central office to which channel 4 is assigned.

An ACK request signal frame is transmitted, being delayed by the duration of a return trip along the transmission line. Therefore, as illustrated in FIG. 10, the ACK request signal frame is returned at a time that is late in the discovery time interval. The CDM reception frame is split into four by a splitter and sent to the respective reception function portions to which channels 1 to 4 are assigned. Herein, the meaning of the term "CDM reception frame" includes a frame that is generated by encoding and multiplexing each of the data transmission frames of channels 1 to 3 and the ACK request signal frame of channel 4.

At the respective reception function portions to which channels 1 to 3 are assigned, decoding processing is carried out with fixed decoding patterns based on the codes assigned to the respective channels. Further, the data signals that have been sent through each channel are extracted from the CDM reception frames at the reception function portions. At the reception function portion to which channel 4 is assigned, decoding is similarly performed and the ACK request signal is extracted.

Figure 11:
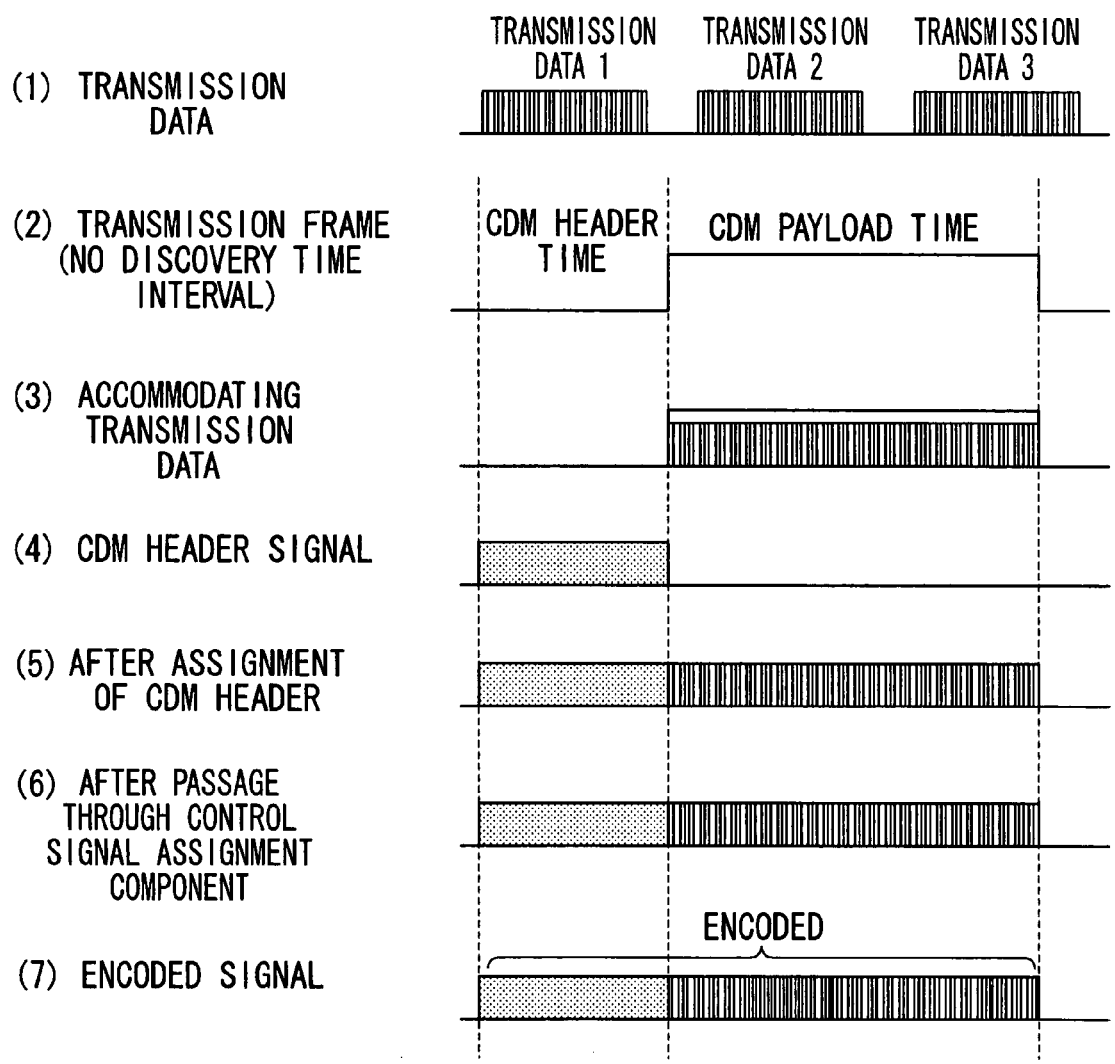
FIG. 11 is a diagram for describing a process of creating a transmission signal frame that does not include a discovery time interval.

The process of generating a transmission signal frame not including the discovery time interval will be described with reference to FIG. 11. FIG. 11 is a diagram for describing the process of creating a transmission signal frame that does not include the discovery time interval. In order from the top, (1) shows transmission data, (2) shows a transmission frame not including the discovery time interval, (3) shows the frame accommodating the transmission data, (4) shows a header signal, (5) shows the frame to which the header signal has been assigned, (6) shows the frame having passed through the control signal assignment component, and (7) shows an encoded digital signal of the frame. The horizontal axis in each drawing is the time axis.

In the following descriptions, when the frames illustrated in (1) to (7) are to be referred to, they are labeled as "frame (1)" to "frame (7)", respectively. The process of generating a transmission frame at the central office will be described, referring to FIG. 11 and FIG. 2. The transmission frame generation process is the same at the first to N-th ONUs.

When a transmission frame not including the discovery time interval is to be outputted, frame (2) is sent to the data accommodation component 56 (see FIG. 2). At the data accommodation component 56, a transmission data signal is accommodated in the payload time slot in the transmission frame. As a result, frame (3) is created. The header signal (4) is generated at the header generator 58 (see FIG. 2), and is accommodated in the frame by the header assignment component 60. As a result, frame (5) is created.

Then, at the control signal assignment component 64 (see FIG. 2), when a frame not including the discovery time interval is to be transmitted, frame (5) passes through the control signal assignment component 64 without alteration. As a result, frame (6), which is outputted from the control signal assignment component 64, is the same as frame (5). The determination of whether or not frame (5) should be passed without alteration in this manner is implemented by the control section 44 (see FIG. 2).

Figure 12:
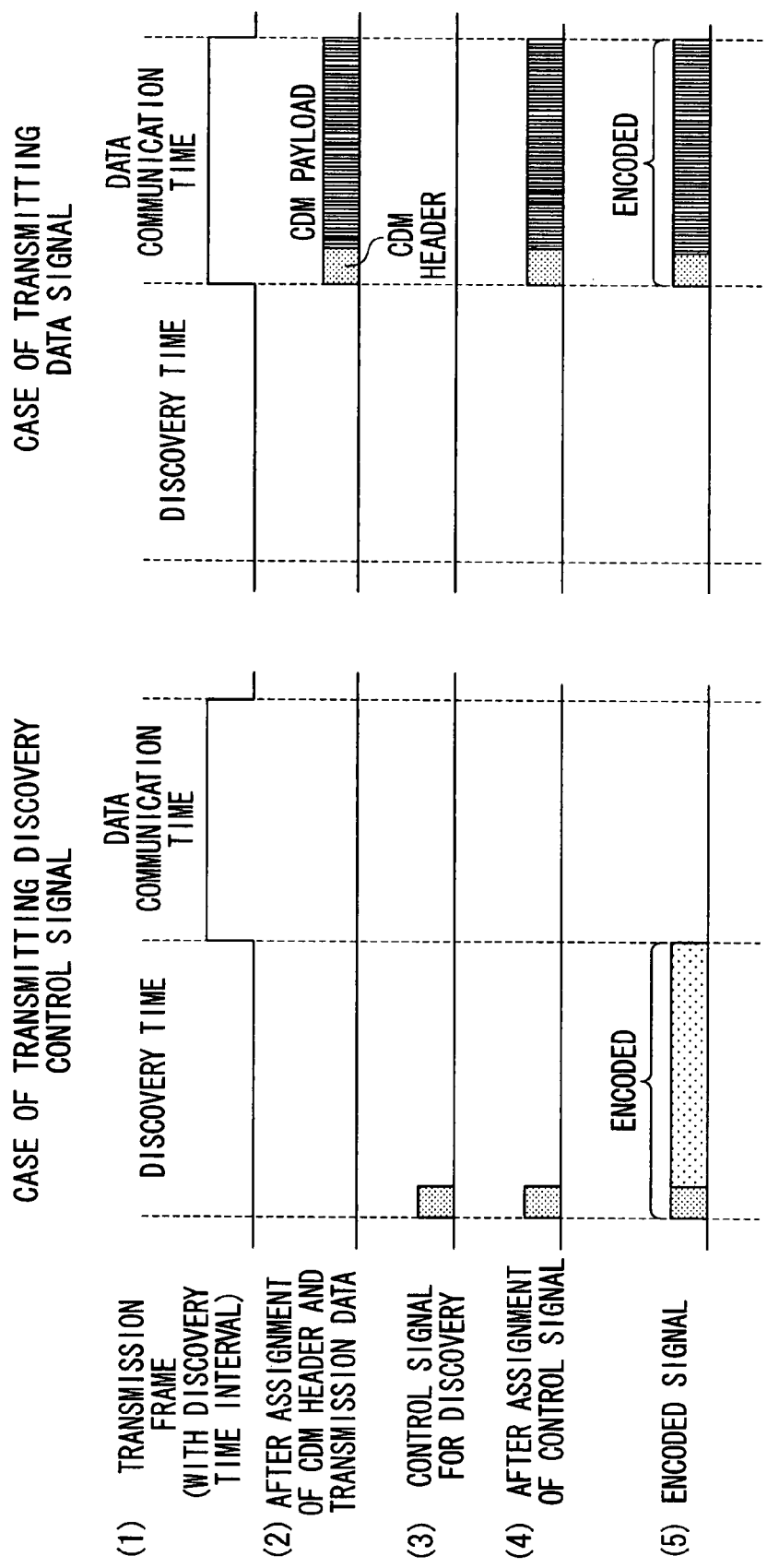
FIG. 12 is a diagram for describing a process of creating a transmission signal frame that includes a discovery time interval.

Next, the process of generating a transmission signal frame including the discovery time interval will be described. FIG. 12 is a diagram for describing the process of creating a transmission signal frame that includes the discovery time interval. A diagram for describing an operation of transmitting a transmission control signal in the discovery time interval is disposed at the left side of FIG. 12, and a diagram for describing an operation of transmitting a data signal in the data communication time interval is disposed at the right side. In FIG. 12, (1) shows transmission frames including the discovery time interval, (2) shows a frame after a header and transmission data have been assigned, (3) shows a discovery control signal, (4) shows the frames after assignment of the control signal, and (5) shows encoded digital signals of the frames.

When communication is carried out with transmission frames including the discovery time interval, operations at the transmission section of the central office are divided into two kinds of operation. The first is an operation of transmitting a transmission control signal in the discovery time interval (illustrated at the left side of FIG. 12), and the second is an operation of data transmission in the data communication time (illustrated at the right side of FIG. 12).

Transmission of a transmission control signal is performed to a ONU in a state in which the connection has been terminated. Accordingly, a transmission function portion of the central office that corresponds to the coding pattern assigned to a ONU that is in a state in which the connection has been terminated implements transmission of the transmission control signal. Meanwhile, transmission of a data signal is performed to a ONU that is in the connected state. Therefore, the transmission function portions of the central office corresponding to the encoding patterns assigned to the ONUs for which the presence check and ranging processing, have been completed implement the transmission of data signals.

The transmission frame including the discovery time interval is sent to the data accommodation component provided at the transmission section of the central office from the frame generator 50 via the transmission frame switching switch 54 (see FIG. 2). In a time slot thereof contained in the discovery time interval, '0' bits or '1' bits are arrayed through the whole length of the slot. When a data transmission frame is outputted from the transmission section, the transmission data and the header are accommodated in the data communication time of the frame (see the second level from the top (2) at the right side of FIG. 12).

In this case (similarly to the case in which the discovery time interval is not included), the control signal assignment component 64 suspends its function, and the header assignment component passes the inputted signal without alteration. Therefore, no signal is outputted in the discovery time interval (see the fifth level from the top (5) at the right side of FIG. 12). On the other hand, when the transmission section is transmitting a transmission signal, the ACK request signal generated by the control signal generator 62 is assigned to the leading end of the discovery time interval (see the third level (3) and fourth level (4) from the top at the left side of FIG. 12).

Next, these signals are encoded by the encoder provided at the transmission function portion for each channel (see the fifth level from the top (5) at the right side and the left side of FIG. 12). Finally, the outputs from the transmission function portions of the channels are multiplexed by the accumulator and sent to the optoelectronic converter.

In the reception functions at the central office and the ONUs, adjustments of reception timings of reception frames are carried out by a gate processing device, which is configured to be provided with a comparator and a D-FF, and a delay component. This reception timing adjustment, similarly to the ranging processing, is carried out by detecting synchronization bit patterns in headers that are included in frames. Accordingly, this reception timing adjustment will be described with reference to FIG. 13.

Figure 13:
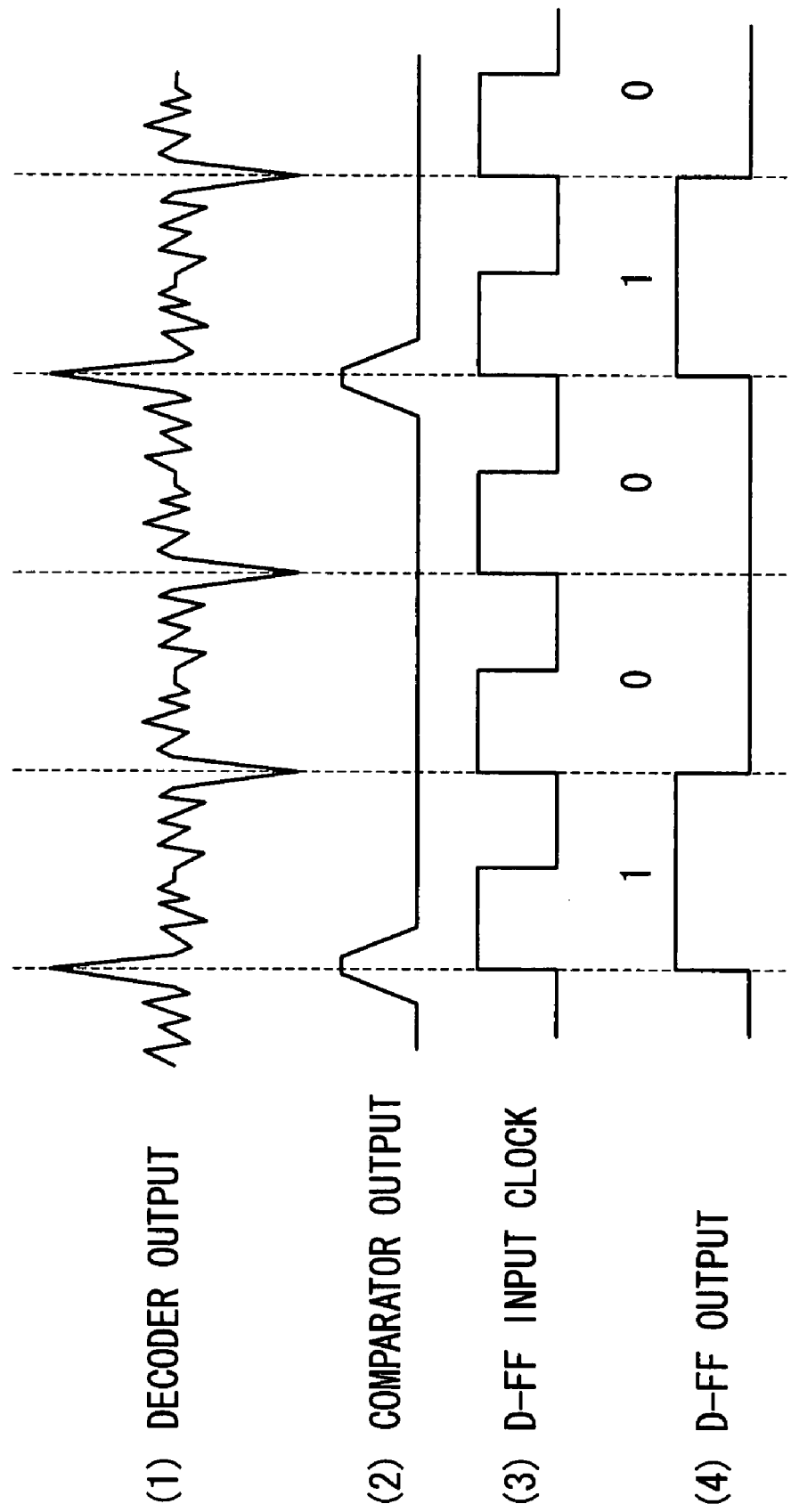
FIG. 13 is a diagram for describing reception timing adjustment.

FIG. 13 is a diagram for describing the reception timing adjustment. In FIG. 13, (1) shows a time waveform of an output signal that is outputted from a decoder, (2) shows a time waveform of an output signal from the comparator, (3) shows a time waveform of an input clock signal at the D-FF, and (4) shows a time waveform of an output signal from the D-FF. The horizontal axis is the time axis in (1) to (4) of FIG. 13.

The comparator determines the output signal that is outputted from the decoder, which is illustrated in (1) of FIG. 13, against a threshold, and converts the output signal to a binary digital signal as illustrated in (2) and outputs the same. Then, time gating processing is carried out with the clock signal illustrated in (3) of FIG. 13, which features a time interval the same as the time interval of the data signal. Consequently, the received signal as illustrated in (4) of FIG. 13 is reproduced. Here, the input clock signal, inputted into the D-FF, is adjusted by the delay component, such that the rising time of the clock signal is synchronized with the binary digital signal outputted by the above-mentioned comparator. Consequent to this sequence of processing being performed, accurate header information is sent to the control section.

<The Effect of the Discovery Time Interval on Transfer Efficiency>

Figure 14:
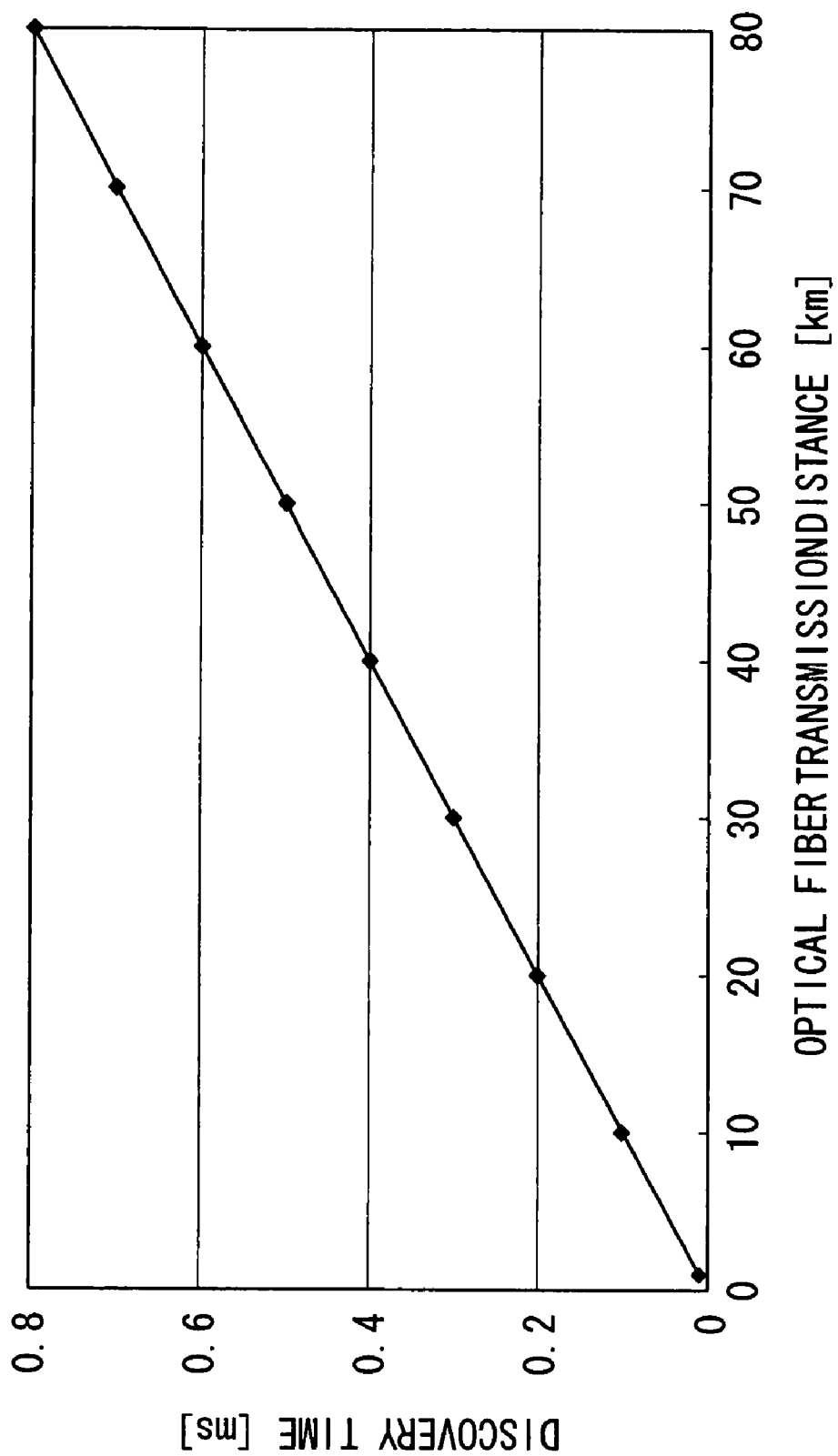
FIG. 14 is a graph illustrating a relationship between optical fiber transmission distance and discovery time.

The relationship between discovery time and optical fiber transmission distance will be described with reference to FIG. 14. FIG. 14 is a graph illustrating the relationship between optical fiber transmission distance and the discovery time. The horizontal axis shows the optical fiber transmission distance, marked in km units. The vertical axis shows the discovery time, marked in millisecond (ms) units.

The meaning of the term "optical fiber transmission distance" corresponds to a distance from the central office to a ONU. The discovery time must have a length for at least the duration of the ACK request signal traveling both ways between the central office and the ONU. Therefore, a minimum value of the discovery time is equal to the duration in which the ACK request signal travels both ways between the central office and the ONU. This duration is proportional to the distance from the central office to the ONU.

Here, for convenience in the following descriptions, a signal transfer efficiency S is defined as follows. The transfer efficiency S of signals when communicating with frames not including the discovery time interval and the transfer efficiency S of signals when the discovery time interval is included are provided by equation (1) and equation (2), respectively.

That is, the transfer efficiency S of signals when communicating with frames not including the discovery time interval is:

$$S=TP/(TH+TP) \tag{1}$$

and the transfer efficiency S of signals when the discovery time interval is included is:

$$S=TP/(TD+TH+TP) \tag{2}$$

in which TP denotes the payload time interval, TD denotes the discovery time, and TH denotes the header time interval.

Figure 15:
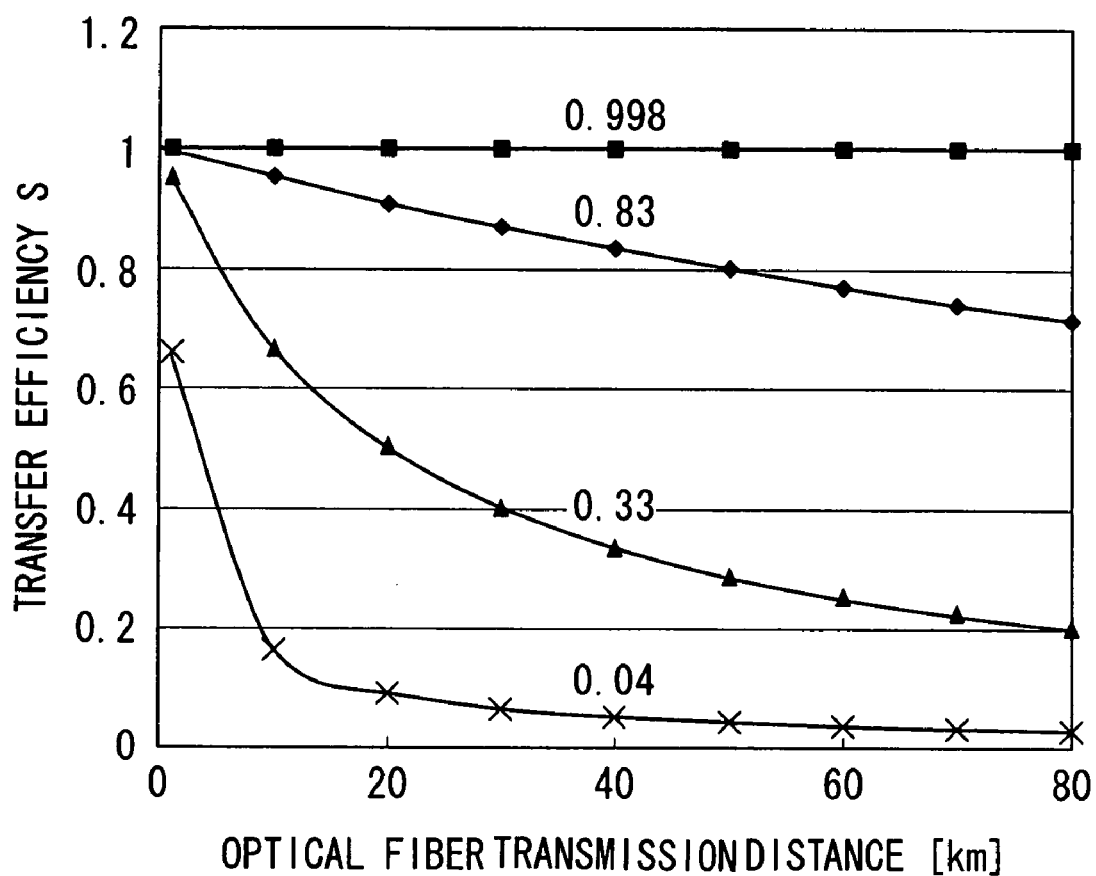
FIG. 15 is a graph illustrating relationships between optical fiber transmission distance and transfer efficiency.

What kind of relationship the transfer efficiency and optical fiber transmission distance have will be described for each of the case in which the discovery time interval is included, and the case in which the discovery time interval is not included, with reference to FIG. 15. FIG. 15 is a graph illustrating the relationship between the optical fiber transmission distance and the transfer efficiency S. The horizontal axis shows the optical fiber transmission distance, marked in km units, and the vertical axis shows the transfer efficiency S. In FIG. 15, the black squares show the transfer efficiency S for a case in which the discovery time interval is not included and TP=20 ms. The black diamonds show the transfer efficiency S for a case in which the discovery time interval is included and TP=2 ms. The black triangles show the transfer efficiency S for a case in which the discovery time interval is included and TP=200 μs. The crosses show the transfer efficiency S for a case in which the discovery time interval is not included and TP=20 μs.

In cases which the discovery time interval is included, as illustrated in FIG. 15, the longer the optical fiber transmission distance, the greater the discovery time interval TD. Due thereto, the longer the optical fiber transmission distance, the lower the transfer efficiency S. Moreover, the transfer efficiency does not improve unless the size of the payload transferred at one time (the payload time interval TP) is larger. In contrast, in the case in which the discovery time interval is not included, no element relating to the optical fiber transmission distance is incorporated. Therefore, the transfer efficiency S is constant regardless of the optical fiber transmission distance.

The present invention is configured to properly use transmission frames that include a discovery time interval and transmission frames that do not include the discovery time interval in accordance with connection conditions of ONUs. Due thereto, a fall in transfer efficiency that is caused by the provision of a discovery time interval in transmission frames is prevented. That is, according to the synchronized CDM communication method and synchronized CDM communication system of the present invention, in cases in which a maximum number of ONUs are in states capable of communication with a central office, communication is performed with transmission frames not including the discovery time interval. Therefore, according to the synchronized CDM communication method and synchronized CDM communication system of the present invention, there is no need for communication efficiency to be lowered.

What is claimed is:

1. A synchronized code division multiplexing communication method that utilizes an access network system including, a common transmission line provided with an optical splitter that branches one input signal to N outputs, N being an integer of at least two, and combines N input signals and outputs one signal, a central office coupled to another end of the common transmission line, N branch transmission lines which are formed by branching by the optical splitter, and first to N-th optical network units that are coupled to the respective branch transmission lines, the access network system performing 1-to-N communication by code division multiplexing between the central office and the first to N-th optical network units, the synchronized code division multiplexing communication method comprising, at the central office:

a presence check step of performing a check of device terminals that are connected to the central office and device terminals that are not connected, on the basis of whether or not the central office receives response signals returned from the first to N-th optical network units;

a ranging processing step of performing a transmission timing adjustment for the optical network units that are connected, on the basis of response times determined by the times at which the response signals are received by the central office;

a connection state acquisition step of performing a verification of whether or not all of the first to N-th optical network units are in the state of being connected with the central office and a verification of whether or not an optical network unit that was not connected at the presence check step has come into the state of being connected since completion of the presence check step; and a transmission frame switching step of, if all of the first to N-th optical network units are in the state of being connected with the central office, switching the network system to communicate with transmission frames that do not include a discovery time interval, if an optical network unit that has not been connected has come into the state of being connected since completion of the presence check step, performing communication with transmission frames that include the discovery time interval, and if it has not been verified that an optical network unit that was confirmed as not being connected in the presence check step has come into the state of being connected since completion of the presence check step, performing communication with transmission frames that do not include the discovery time interval.

2. The synchronized code division multiplexing communication method according to claim 1, wherein the presence check step comprises:

a) distributing a transmission pause instruction from the central office to all of the first to N-th optical network units and setting all of the first to N-th optical network units to a standby state;

b) setting a value of k, which is a parameter that takes all integer values from 1 to N, to 1;

c) transmitting a transmission permission signal from the central office to the k-th optical network unit;

d) determining whether or not a response signal from the k-th optical network unit is received at the central office;

e) if the response signal is received, registering the k-th optical network unit as an optical network unit that is connected;

f) if the response signal is not received, registering the k-th optical network unit as an optical network unit that is not connected;

g) transmitting a transmission pause instruction to the k-th optical network unit;

h) determining whether or not the value of k is equal to the value of N; and i) increasing the value of k by 1, wherein, if the response signal is not received in (d), the presence check step passes through (f) and proceeds from (f) to (h), and in (h), if N>k, the presence check step proceeds to (i), and if N=k, the presence check step ends.

3. The synchronized code division multiplexing communication method according to claim 1, wherein the ranging processing step comprises:

assigning serial numbers to the optical network units for which the response signal has been received in the presence check step, in order from a smallest, to set optical network unit $N_1$ to optical network unit $N_M$, M being a parameter that takes an integer value between 1 and N;

a) distributing a transmission pause instruction from the central office to all of optical network unit $N_1$ to optical network unit $N_M$ and setting all of the optical network units $N_1$ to $N_M$ to a standby state;

b) selecting the optical network unit $N_1$ and the optical network unit $N_2$ from the optical network units for which the response signal was received in the presence check step, and transmitting a transmission permission signal from the central office to the optical network unit $N_1$ and the optical network unit $N_2$;

c) adjusting a transmission timing of the optical network unit $N_2$ with the optical network unit $N_1$ serving as a reference;

d) receiving a synchronization bit pattern signal from the optical network unit $N_1$ and the optical network unit $N_2$;

e) determining whether or not the synchronization bit pattern signal of the optical network unit $N_1$ and the synchronization bit pattern signal of the optical network unit $N_2$ are synchronized;

f) transmitting a synchronization completion signal from the central office to the optical network unit $N_2$; and g) fixing the transmission timing at the optical network unit $N_2$ at a last value, wherein (b) to (g) are executed for all of the optical network units $N_3$ to $N_M$ for which a response signal was received in the presence check step, with the optical network units $N_3$ to $N_M$ being sequentially substituted for the optical network unit $N_2$.

4. The synchronized code division multiplexing communication method according to claim 1, wherein the connection state acquisition step comprises:

a) reading the number of the optical network units determined to be connected in the presence check step from a storage device provided at the central office;

b) determining whether or not the number of optical network units determined to be connected that has been read in (a) is equal to N;

c) starting communication of transmission frames that do not include the discovery time interval;

d) monitoring serial numbers of optical network units that are transmission sources of upstream signals transmitted to the central office, identifying the optical network units from which the upstream signals have been transmitted as optical network units that are in a communication state, and saving the serial numbers of these optical network units in the storage device provided at the central office;

e) determining whether or not there is an optical network unit in a communication-paused state;

f) deleting a registration of the serial number of the optical network unit that is in the communication-paused state from the storage section provided at the central office;

g) starting communication of transmission frames that include the discovery time interval;

h) reading serial numbers of the optical network units that were not connected with the central office at the presence check step from the storage device provided at the central office;

i) transmitting a transmission permission signal from the central office to, of the optical network units that have been not connected with the central office, the optical network unit with the smallest serial number;

j) receiving a response signal from the optical network unit to which the transmission permission signal has been transmitted in (i);

k) if the response signal is not received from the optical network unit to which the transmission permission signal has been transmitted in (i), selecting, of the optical network units that have been not connected with the central office, the optical network unit with the next serial number up from the serial number of the optical network unit to which the transmission permission signal was transmitted in (i), and returning to (i);

l) performing a transmission timing adjustment for the optical network unit that has been verified as being connected by the response signal being received in (j);

m) receiving a synchronization bit pattern signal from the optical network unit for which the transmission timing adjustment is carried out in (l);

n) assigning serial numbers to optical network units from which the synchronization bit pattern signal has been received in (m), in order from a smallest, to set optical network unit $N_1$ to optical network unit $N_M$, and determining whether or not the synchronization bit pattern signal received in (m) and the synchronization bit pattern signal of the optical network unit $N_1$ are synchronized;

o) at the central office, if synchronization is verified in (n), registering the serial number of the optical network unit verified as being connected in (j) as a new optical network unit in the storage device provided at the central office;

p) implementing a synchronization completion notification and a serial number registration completion notification from the central office to the optical network unit verified as being connected in (j); and q) fixing a timing value at the optical network unit verified as being connected in (j) at a last value, wherein, if, in (b), the number of optical network units determined to be connected is equal to N, N being a maximum connection number, the connection state acquisition step proceeds to (c), and if the same are not equal, the connection state acquisition step proceeds to (g), if an optical network unit in the communication-paused state is present in (e), the connection state acquisition step proceeds to (f), and if the same is not present, the connection state acquisition step proceeds to (d), if, in (j), the response signal is received from the optical network unit to which the transmission permission signal has been transmitted, the connection state acquisition step proceeds to (l), and if the same is not received, the connection state acquisition step proceeds to (h), and if synchronization is determined in (n), the connection state acquisition step proceeds to (o), and if synchronization is not determined, the connection state acquisition step proceeds to (l).

5. A synchronized code division multiplexing communication system that utilizes an access network system including, a common transmission line provided with an optical splitter that branches one input signal to N outputs, N being an integer of at least two, and combines N input signals and outputs one signal, a central office coupled to another end of the common transmission line, N branch transmission lines which are formed by branching by the optical splitter, and first to N-th optical network units that are coupled to the respective branch transmission lines, the access network system performing 1-to-N communication by code division multiplexing between the central office and the first to N-th optical network units, the synchronized code division multiplexing communication system comprising, at the central office:

a presence check section that performs a check of device terminals that are connected to the central office and device terminals that are not connected, on the basis of whether or not the central office receives response signals returned from the first to N-th optical network units;

a ranging processing section that performs a transmission timing adjustment for the optical network units that are connected, on the basis of response times determined by the times at which the response signals are received by the central office;

a connection state acquisition section that performs a verification of whether or not all of the first to N-th optical network units are in the state of being connected with the central office and discovery of an optical network unit, among the optical network units that are not connected, that has come into the state of being connected during communication operations since completion of the check and is newly participating in communication; and a transmission frame switching switch that switches between transmission frames that include a discovery time interval and transmission frames that do not include the discovery time interval.

6. A synchronized code division multiplexing communication system that utilizes an access network system including, a common transmission line provided with an optical splitter that branches one input signal to N outputs, N being an integer of at least two, and combines N input signals and outputs one signal, a central office coupled to an other end of the common transmission line, N branch transmission lines which are formed by branching by the optical splitter, and first to N-th optical network units that are coupled to the respective branch transmission lines, the access network system performing 1-to-N communication by code division multiplexing between the central office and the first to N-th optical network units, the synchronized code division multiplexing communication system comprising, at the central office:

a presence check section that performs a check of device terminals that are connected to the central office and device terminals that are not connected, on the basis of whether or not the central office receives response signals returned from the first to N-th optical network units;

a ranging processing section that performs a transmission timing adjustment for the optical network units that are connected, on the basis of response times determined by the times at which the response signals are received by the central office;

a connection state acquisition section that performs a verification of whether or not all of the first to N-th optical network units are in the state of being connected with the central office and discovery of an optical network unit, among the optical network units that are not connected, that has come into the state of being connected during communication operations since completion of the check and is newly participating in communication; and a transmission frame switching switch that switches between transmission frames that include a discovery time interval and transmission frames that do not include the discovery time interval, wherein each of the first to N-th optical network units is provided with a transmission frame switching switch that switches between the transmission frames that include the discovery time interval and the transmission frames that do not include the discovery time interval.

* * * * *